United States Patent
Robertson

(10) Patent No.: US 6,609,106 B1
(45) Date of Patent: Aug. 19, 2003

(54) SYSTEM AND METHOD FOR PROVIDING ELECTRONIC MULTI-MERCHANT GIFT REGISTRY SERVICES OVER A DISTRIBUTED NETWORK

(76) Inventor: Steven C. Robertson, 26903 138th Ave. SE., Kent, WA (US) 98042

( * ) Notice: Subject to any disclaimer, the term of this patent is extended or adjusted under 35 U.S.C. 154(b) by 0 days.

(21) Appl. No.: 09/307,166

(22) Filed: May 7, 1999

(51) Int. Cl.⁷ .............................................. G06F 17/60
(52) U.S. Cl. ............................. 705/26; 705/27; 705/14
(58) Field of Search ............................. 705/26, 27, 14

(56) References Cited

U.S. PATENT DOCUMENTS

| | | | |
|---|---|---|---|
| 5,113,496 A | * 5/1992 | McCalley et al. | 710/305 |
| 5,754,981 A | * 5/1998 | Veeneman et al. | 705/26 |
| 5,774,874 A | 6/1998 | Veeneman et al. | 705/27 |
| 5,826,039 A | * 10/1998 | Jones | 709/206 |
| 5,895,468 A | * 4/1999 | Whitmyer, Jr. | 707/10 |
| 5,898,594 A | * 4/1999 | Leason et al. | 700/231 |
| 5,963,915 A | * 10/1999 | Kirsch | 705/26 |
| 5,970,474 A | * 10/1999 | LeRoy et al. | 705/27 |
| 6,016,504 A | * 1/2000 | Arnold et al. | 709/200 |
| 6,094,681 A | * 7/2000 | Schaffer et al. | 709/224 |
| 6,128,663 A | * 10/2000 | Thomas | 709/228 |
| 6,360,254 B1 | * 3/2002 | Linden et al. | 709/219 |
| 6,393,490 B1 | * 5/2002 | Stiles et al. | 709/313 |
| 2002/0010623 A1 | * 1/2002 | McCollom et al. | 705/14 |

FOREIGN PATENT DOCUMENTS

WO    WO 94/27226 A1 * 11/1994

OTHER PUBLICATIONS

Anon., "Electronic Retailing:A Competitive Edge" HFD—The Weekly Home Furnishings Newspaper, vol. 57, p. 22, Dec. 19, 1983.*

Anon., "JL Hudson Will Install Customer–Operated Computers in its Bridal Registries in 9/83," HFD, Aug. 22, 1983, p. 22.*

Fox, B., "Here Comes the (New) Bridal Registry," Store Age Executive, Voo. 67, No. 10 (Section 1), pp. 58–64, Oct. 1992.*

Kehoe, A–M., "Technology Comes to Tabletop," HFD—The Weekly Home Furnishings Newspaper, May 24, 1993, p. 45.*

(List continued on next page.)

Primary Examiner—Nicholas David Rosen

(57) ABSTRACT

An online Gift Registry Service provides registration of information for a gift registrant and allows access to the registry by potential gift giver users. In addition, users can tag items of interest at participating Service Provider (SP) sites and the SP sites will register these items with the Gift Registry Service on the user's behalf. It further provides a streamlined checkout process for purchasing these gift items with the registered SP sites (e.g. World Wide Web sites) over a distributed public network. Users and Service Providers (SP) initially register with the Gift Registry Service and are provided additional functionality. For users, a reminder service is provided to notify individuals automatically upon the trigger of certain events, such as important dates or product sales from online merchants. In addition, there are various occasion planning services available such as distribution lists, discussion groups, and other related resources for multiple events including weddings, baby showers, etc. These other resources include sending out announcements, reserving halls, and contracting services of related businesses for the occasion. A distinct advantage of this system is that users can perform all the planning for the event online in the comfort of their home or office. Service Providers on the other hand, can register system notification messages to be triggered on pre-determined events. In addition, Service Providers can obtain marketing information to tailor their products and services.

19 Claims, 41 Drawing Sheets

OTHER PUBLICATIONS

Barth, C., "Office Technology," Management Accounting, vol. 75, No. 6, pp. 65–66, Dec. 1993.*

Anon., "Carson's Quantum POS Leap," Chanin Store Age Executive, vol. 70, No. 1 (Section 1), pp. 98–103, Jan. 1994.*

Anon., "Bridal Registry Guide Joins Service Merchandise Family," Discount Store News, vol. 33, No. 19, pp. 11, Oct. 3, 1994.*

Schwartz, D.B., "Net Sales," HFN, vol. 69, No. 8, p. 1+, Feb. 20, 1995.*

Anon., "Giving the Perfect Graduation Gift Made Easy with Computerized Registry System," PR Newswire, May 2, 1995.*

Bernard, S., "A Website for Store Registries," HFN, vol. 69, No. 31, p. 27+, Jul. 31, 1995.*

Bernard, S., "Purchasing Bridal Gifts via the Net," HFN The Weekly Newspaper for the Home Furnishing Network, vol. 69, No. 44, p. 31, Oct. 30, 1995.*

Anon., "Santa Cruz, Wanting a Piece of Unix–Based Internet Action, Has 'Atlas' Products and Services to Offer," Computergram International, No. 846, Feb. 7, 1996.*

The Microsoft Press Computer Dictionary, Third Edition, Microsoft Press, pp. 31, 425, 426, and 434, 1997.*

Anon., 'New York Today' from the New York Times Makes On–Line Debut Thursday, Jun. 16, PR Newswire, Jun. 15, 1998.*

Sample, A., "The Wedding List Co. Debuts in New York," HFN, vol. 73, No. 14, p. 51+, Apr. 5, 1999.*

Anon., "Retailers Say 'I Do' to Wedding Web Site," The Wall Street Journal, vol. CCXXXIII, No. 111, p. B9, Jun. 9, 1999.*

* cited by examiner

User Registration

Please provide the following profile information. The asterisks (*) below note require information. Note that only your name, city, and state are public information - the rest being private by default. Un-check the checkbox next to the field to make the information public.

Personal Information

First Name*  |  Middle Name  |  Last Name *
[Joseph]  [H.]  [Smith —305]

☒ Daytime Phone  ☒ Evening Phone  ☒ FAX
[123-456-7890]  [123-456-7891]  [ ]

☒ E-mail Address *  —275
[myname] @ [mycompany] · [com ▼]

Logon Password *  |  Logon Password Hint  |  Gift Registration Password *
[******]  [****]  [******]

Shipping Information

☒ Address 1*
[123 Main Street]

☒ Address 2  —280
[ ]

City*  |  State/Province*  |  Zip/Postal Code*
[Seattle]  [Washington ▼]  [98052]

Country*  [United States ▼]  —285

Marketing Information

☒ Merchant Sale Opt Out
☐ Gift Registry Promotions Opt Out

290  —295
[Reset Form]  [Submit Registration]

*Figure 16*

User Registration Confirmation

Thank You for your Registration. You will be receiving an e-mail shortly with this information, but you may also want to print this page for future reference.

Registered Individual

Gift Registry ID: U1V3456C900

Joseph H. Smith
123 Main Street
Seattle, Washington 98052
USA

Daytime Phone: 123-456-7890
Evening Phone: 123-456-7891
FAX:

E-mail Address: myname@mycompany.com

Public Viewing Permission

The following fields are the ones you allowed to be made publicly available.

None

In addition, the following information is available publicly as a condition of using the features of this site.
    First Name: Joseph
    Middle Name: H
    Last Name: Smith
    City: Seattle
    State: Washington
    Zip: 98052
    Country USA

Marketing Information

☒ Merchant Sale Opt Out

☐ Gift Registry Promotions Opt Out      — 300

Return to Gift Registry Home Page

*Figure 17*

SP Registration

We would like to welcome you to our Preferred Reseller Program. Please provide the following profile information. The asterisks (*) below note require information. Note that only your name, city, and state are public information - the rest being private by default. Un-check the checkbox next to the field to make the information public.

Company Contact Information

First Name*: Joseph
Middle Name: H.
Last Name *: Smith

☒ Daytime Phone: 123-456-7890
Customer Service Phone: 123-456-7891
☒ FAX:

☒ E-mail Address *: myname @ mycompany . com ▼ —275

Logon Password *: ********
Logon Password Hint: ********

Company Address

Company Name*: Cool Products

☒ Address 1*: 123 Main Street

☒ Address 2: —280

City*: Seattle
State/Province*: Washington ▼
Zip/Postal Code*: 98064

Country*: United States ▼ —285

System Communication

System Password *: ******** —305

310 — Reset Form
315 — Submit Update

Figure 18

SP Registration Confirmation

Thank You for your Registration. You will be receiving an e-mail shortly with this information and detailed communication setup procedures, but you may also want to print this page for future reference.

Registered Merchant

Gift Registry Merchant ID: M1V3456C900

Cool Products
123 Main Street
Seattle, Washington 98052
USA

Customer Service Phone: 123-456-7891

Contact Person: Joseph H. Smith
Daytime Phone: 123-456-7890
FAX:

E-mail Address: myname@mycompany.com

Public Viewing Permission

The following fields are the ones you allowed to be made publicly available.

123 Main Street
    Customer Service Phone: 123-456-7891

In addition, the following information is available publicly as a condition of using the features of this site.

Company: Cool Products
    City: Seattle
    State: Washington
    Zip: 98052
    Country USA

/—300

Return to Gift Registry Home Page

*Figure 19*

User Profile Maintenance

Please provide the following profile information. The asterisks (*) below note require information. Note that only your name, city, and state are public information - the rest being private by default. Un-check the checkbox next to the field to make the information public.

Personal Information

First Name*  [Joseph]   Middle Name  [H.]   Last Name *  [Smith]

☒ Daytime Phone    ☒ Evening Phone    ☒ FAX
[123-456-7890]     [123-456-7891]     [ ]

☒ E-mail Address *                                                  — 275
[mynam] @ [mycompan] · [com ▼]

Logon Password *    Logon Password Hint    Gift Registration Password *
[******]          [****]             [******]

Shipping Information

☒ Address 1*
[123 Main Street]

☒ Address 2                                 — 280
[ ]

City*              State/Province*         Zip/Postal Code*
[Seattle]          [Washington ▼]          [98052]

Country*  [United States ▼] — 285

Marketing Information

☒ Merchant Sale Opt Out
☐ Gift Registry Promotions Opt Out

— 380                    — 385

[Reset Form]         [Submit Update]

*Figure 23*

SP Profile Maintenance

We would like to welcome you to our Preferred Reseller Program. Please provide the following profile information. The asterisks (*) below note require information. Note that only your name, city, and state are public information - the rest being private by default. Un-check the checkbox next to the field to make the information public.

Company Contact Information

First Name* — Joseph
Middle Name — H.
Last Name * — Smith

☒ Daytime Phone — 123-456-7890
☒ Daytime Phone Ext. — 123-456-7891
☒ FAX

☒ E-mail Address * — myname @ mycompany . com —275

Logon Password * — ********
Logon Password Hint — ********

Company Address

Company Name* — Cool Products

☒ Address 1* — 123 Main Street

☒ Address 2 —280

City* — Seattle
State/Province* — Washington
Zip/Postal Code* — 98064

Country* — United States —285

System Communication

System Password * — ******** —305

390 — Reset Form
395 — Submit Update

Figure 24

User Reminders

You may register for as many reminder events as you desire.

Reminder 1

Event — 400 — Birthday ▼
Month — 405 — October ▼
Day — 410 — 7 ▼
Year — 415 — All ▼

Description — 420
[                    ]

Reminder 2

Event ▼
Month ▼
Day ▼
Year 2000 ▼

Description
[                    ]

Reminder 3

Event ▼
Month ▼
Day ▼
Year 2000 ▼

Description
[                    ]

[Save and Add More Reminders] — 425

View our Privacy Statement

*Figure 25*

SP Notification Events

You may register for as many notification events as you desire.

Event 1

Please notify me by [E-mail Message ▼] —430 when [User Threshold ▼] —435 is [Greater Than ▼] —440  [100] —445 (Quantity) for items in Category for items in Category [All ▼] —450 and filtered on Items that match

☐ Name ⬜ —455

☐ Universal Product Code (UPC) ⬜

☐ <merchant name> as —465   ⬜ —460
Preferred Reseller

[Save and Add More Events] —470

View our Privacy Statement

*Figure 26*

Occasion Registration

This screen will assist you in planning for a major event.

Event Date & Time

| Event —400 | Month —405 | Day —410 | Year —415 |
|---|---|---|---|
| Wedding ▼ | March ▼ | 2 ▼ | 2001 ▼ |

Description

[Wedding Reception to follow.] —420

Event Distribution Lists —475

| Description List Name | # of Individuals |
|---|---|
| Bride's Family | 25 |
| Bride's Work & Friends | 250 |
| Groom's Family | 10 |
| Groom's Work & Friends | 125 |

Total # of Individuals  410

[ Add Distribution List ] —480  [ Delete Distribution List ] —485

[ Modify Distribution List ] —490  [ Send Notifications ] —495

Gift Registration —500

| Gift Description | Cost of Item | # Requested | # Received | Preferred Reseller |
|---|---|---|---|---|
| Colonial China Set | $500.00 | 1 | 0 | Bulls China Shop |
| Bread Maker | $100.00 | 1 | 1 | Joe's Bakery |
| Crystal Goblet | $25.00 | 8 | 4 | Bulls China Shop |

[ Add Gift Item ] —505   [ Modify Gift Item ] —510   [ Delete Gift Item ] —515

[ Register Event ] —520

View our PrivacyStatement

*Figure 27*

"Wish" List Maintenance

This screen will assist you in maintaining your "Wish" list.

Gift Registration

| Gift Description | Category | Approx. Cost |
|---|---|---|
| Best Diving Locations by J.M. Smith | Book | $29.95 |
| Diving Photography CD-ROM | Software | $45.00 |
| American Airlines Tickets to Belize | Entertainment | $750.00 |

Add Gift Item — 505

Modify Gift Item — 510

Delete Gift Item — 515

View our Privacy Statement

*Figure 28*

Marketing Statistics

Click on the arrow to expand and collapse the sections to display appropriate reports.

520 — ▶ Product Information

525 — ▽ User Demographics
        All Visitors by Domain
        Registered Users by Domain 520 — ▶ Merchant Demographics

520 — ▶ Notification Information

520 — ▶ Gift Purchases

520 — ▶ Registered Occasion Information

View our Terms of Use

*Figure 29*

Gift Recipient Selection

Find the Gift Recipient By Either: —530

○ Gift Registrant ID [_____]

Or By:
● Name — 535

First Name [_____]  Middle Name [_____]  Last Name [Smith]

City [_____]  State/Province [_____]  Zip/Postal Code [_____]

Country* [United States ▼] —285

You must have a value in at least 1 field for the search.

[ Search ] —540

Figure 30

Gift Purchase for Joseph Smith
of Seattle, WA.

Basket     Status as of October 1, 2000 1:47 PM (Pacific Standard Time)

| Availability | Est. Delivery Date | Product Name | Qty. | Price —590 | Item Total |
|---|---|---|---|---|---|
| In Stock | Oct. 7, 2000 | Gadget 1 | [1] | $29.95 | $29.95 |
| Back Ordered | Nov. 1, 2000 | Gadget 2 | [1] | $45.00 | $45.00 |

—595
Shipping Method
[ 2nd Day ▼ ]

—600
[ Recalculate Basket ]

Subtotal:    $74.95
Shipping:    $5.00
Tax:    $6.45

Total:    $86.40

Payment Information

| | | |
|---|---|---|
| Credit Card Type | [ Visa ▼ ] | —605 |
| Expiration Month | [ 01 - December ▼ ] | —610 |
| Expiration Year | [ 2000 ▼ ] | —615 |
| Name on Credit Card | [_____] | —620 |
| Credit Card Number | [_____] | —625 |

—630
[ Submit Order ]

*Figure 36*

Thank You For Your Order!

Please print your order confirmation to keep for your records. You will be receiving an e-mail confirmation shortly.

Order Number 1234  Order Date October 1, 2000

Basket

| Availability | Est. Delivery Date | Product Name | Qty. | Price | Item Total |
|---|---|---|---|---|---|
| In Stock | Oct. 7, 2000 | Gadget 1 | 1 | $29.95 | $29.95 |
| Back Ordered | Nov. 1, 2000 | Gadget 2 | 1 | $45.00 | $45.00 |

Subtotal: $74.95
Shipping: $5.00
Tax: $6.45

Total: $86.40

Shipping Information

Gift Purchase for Joseph Smith of Seattle, WA.
Gift Registry ID: 1234

*Figure 37*

Wish List Registration

We thank you for considering us for a future purchase, whether by yourself or by someone purchasing a gift on your behalf.

So that we may associate the items that you added to your local "Wish" list with us with your central "Wish" list with Gift Registry, please provide one of the following.

Gift Registry ID: [_____] ⟵ 655

[ Register ] ⟵ 660 or

If you forgot your Gift Registry ID, then supply us your e-mail and we will look it up for you.

E-mail Address: [_____] ⟵ 665

[ Look up my Gift Registry ID ] ⟵ 670

*Figure 39*

Locate Registered Occasion

To assist you in finding the proper event, please begin by choosing the appropriate event type.

Event Type: [ Wedding ▼ ] —400

Next, please provide at least one of the following pieces of information. Keep in mind that the more information you provide, the narrower your search will be.

Last Name Associated with Event: —675

City: —680

State: [ Washington ▼ ] —280

Country: [ United States ▼ ] —285

[ Find Occasion ] —685

*Figure 40*

SYSTEM AND METHOD FOR PROVIDING ELECTRONIC MULTI-MERCHANT GIFT REGISTRY SERVICES OVER A DISTRIBUTED NETWORK

CROSS-REFERENCE TO RELATED APPLICATIONS

Not applicable.

1. Field of Invention

This invention relates to an online gift registry and reminder system that allows consumers to register gifts or items of interest in a centralized "Wish List" database. These gifts can be open-ended or tied to a specific event such as a wedding.

2. Description of Prior Art

Traditionally, in the United States, there have been bridal registries available in department stores that allow couples to register gifts that they would like to receive for a wedding present, but there are no corresponding registries for other occasions. Some other occasions may be such as a) Baby Showers; b) Christmas; c) Graduations; d) Funerals; d) Birthdays; e) Father's Day; f) Mother's Day; g) Anniversaries; and other holiday or religious events.

The current practice is for a single store, usually a large department store to provide a bridal registry service, which are commonly known. The registrants typically register at more than one store to provide alternatives for potential gift-givers. Additionally, potential purchasers must visit these stores, wait in line, and then enter certain information to identify the registrant, only to be given a limited list of items of interest to the registrant that is offered at that particular store.

Currently, the larger stores are the only ones providing bridal registries due to the cost involved in developing and operating gift registry systems. Consequently, smaller stores don't have the funds or facilities to provide these services to their customers and thus have to do without. Additionally, potential purchasers may not like the store typically used for the registry, or may be able to find the same item at a different store for a lower price.

The present invention involves the problem of allowing individuals to register gifts from multiple online business entities, referred to herein as Service Providers, "SPs", or Merchants. These gifts available from selected Service Providers are generally limited to wedding gifts, such as china, crystal, silver, and other household items.

A more recent partial solution, which exploits the low cost and wide availability of the Internet, has been for some bridal-registry specific Internet sites to host their own content as World Wide Web sites ("Web" or "WWW" sites) which can be accessed by consumers "directly" via the Internet. With this approach, the user (consumer) typically registers with the Bridal Web site and enters information for a single event. Family and friends visit this web site to view the list of items that are of interest to the couple, but once this event occurs (i.e. Wedding ceremony), there is no longer a need for this service. Another limitation of this approach is the limited integration with participating SPs or merchants.

While this kind of self-service bridal registry has met with tremendous acceptance in the marketplace, there is a continued need for a multi-merchant registry that allows for individuals to seamlessly register gifts for all occasions, even while browsing merchant sites. Furthermore, there is a great need to be automatically notified of future events related to the gift registration process.

SUMMARY

The present invention provides a system and method in which Service Providers host their own content as directly-accessible sites (referred to herein as "SP sites") on a distributed network such as the Internet, while relying on a centralized Gift Registry site (which implements an Online Gift Registry Service) to handle the registration of individual "Wish" lists. The system advantageously allows users to register items from the SP sites while shopping, without having to access the centralized Gift Registry site directly.

This invention provides a system for registering items selected by a registrant from a plurality of participating merchants for subsequent communication to a prospective purchaser. In this way, a registrant can provide information about his or herself through a computer terminal, be assigned a unique identifier, and then identify items on participating SP web sites that they wish to add to their "Wish" list. These items may be traditional merchandize such as clothing, household items, etc. or may include digital products or services such as downloadable software, online publications (e.g. magazines and newspapers) and subscription services as well as travel-related and financial services.

In a preferred embodiment the SP sites are in the form of Web sites on the Internet, and the online services available on the Web sites provide mechanisms of sending the registrant's "Wish" list items back to the centralized Gift Registry site. Along with information related to the items chosen by the registrant, the SPs will provide additional information such as their unique identifier to be used as the preferred reseller of the item for the registrant.

The system and method of invention are advantageously suited for use over a unsecured public network such as the Internet. In general, however, the system and method can be used on any type of distributed network over which online services are provided by SPs to users. This may include both trusted and untrusted networks and public, private, or hybrid public-private networks.

One significant benefit of above-described approach is that the Service Providers need not be concerned with the problems of registering and maintaining user profiles and "Wish" lists for every potential shopper. In addition, they may provide a notice to a central location of a "Sale" event on an item, which may trigger notifications, or messages to individuals with an interest in that item resulting in new sales that would not have been generated otherwise. This would also allow them to reach potential new customers that may have never come in contact with their Web site accept through the notification process of this invention. The cost to an SP for this system, would be minimal in that server-side code would be provided The major benefit to the individual is that they can store a complete "Wish" list of all items of interest in a central location that others may access for gift purchases and do so in a faster method than previous inventions. In addition, the registrants may wish to delay purchases to some future time or event and be notified automatically when that time or event occurs.

The benefit to the gift-giver or purchaser is that they have a wider selection of items and SPs to choose from. In addition, they can choose to be shown items in a given price range or category on the gift-receiver's "Wish" list. Thus they are not limited to a single merchant and may shop for a comparable item or even the same item at a reduced cost at a different merchant than the preferred reseller. Another major benefit to the purchaser is that of convenience and ease of use. From the comfort of their own home, they can access the system, find a desired item to purchase, and place an order with a participating reseller through a computer system in a very short amount of time as opposed to going to a retail establishment, waiting in line, and purchasing the item. Thus there is a significant time savings.

The various embodiments and method will become more apparent on consideration of the drawings and ensuing description.

OBJECTS AND ADVANTAGES

Accordingly, the objects and advantages of the present invention are:

(a) to provide a system and method which allows for a centralized online gift registry.

(b) to provide a system and method that provides a gift registry for all occasions—not just bridal events.

(c) to provide a system and method that allows all online stores, both large and small, to participate.

(d) to provide a system and method whereby multiple online stores can participate.

(e) to provide a system and method whereby any kind of item of interest can be registered including digital products and information services.

(f) to provide a system that allows for a quick registration process which can take place in the user's home at their convenience.

(g) to provide a system that automatically notifies a registered user if an item on their "Wish" list is offered for sale by a registered merchant.

(h) to provide a system and method whereby the registrant can maintain event distribution lists.

(i) to provide a system and method that a gift purchaser can find an item of interest for a registrant and be shown the registrant's preferred reseller.

(j) to provide a system and method whereby the gift purchaser can filter the registrant's "Wish" list based on criteria.

(k) to provide a system and method whereby the gift purchaser can quickly find an item of interest for a registrant and order the item online in a quick and convenient manner.

(l) to provide a system and method whereby the Service Providers and Users can register to be automatically notified upon the triggering of different events.

(m) to provide a system and method whereby the Service Providers can register "sale" events, which will automatically notify users that have an interest in the item being advertised "on sale".

(n) to provide a system and method whereby the Service Providers may obtain generalized marketing information on the registrants to tailor their own system or to offer services to a targeted audience.

(o) to provide a system and method whereby individuals can participate in discussion groups with others interested in the same topic.

(p) to provide a system and method whereby recommendations can be made for an individual based on past buying habits and desires.

Further objects and advantages of this invention will become apparent from a consideration of the drawings and ensuing description.

BRIEF DESCRIPTION OF THE DRAWINGS

These and other features and advantages of the invention will now be described with reference to the drawings of certain preferred embodiments, which are intended to illustrate and not to limit the invention, and in which:

FIG. 16 is an illustration representing the User Registration Page provided by the system for a new user to register themselves with the Gift Registry system.

FIG. 17 is an illustration representing the User Registration Confirmation Page provided by the system once the new use information is validated and stored in the User database.

FIG. 18 is an illustration representing the SP Registration Page provided by the system for a new Service Provider to register themselves with the Gift Registry system.

FIG. 19 is an illustration representing the SP Registration Confirmation Page provided by the system once the new Service Provider's information is validated and stored in the SP database.

FIG. 23 is an illustration representing the User Profile Maintenance Page, which is used to update and maintain the user's profile.

FIG. 24 is an illustration representing the SP Profile Maintenance Page, which is used to update and maintain the Service Provider's profile.

FIG. 25 is an illustration representing the User Reminders Page, which is used to register reminders for the user.

FIG. 26 is an illustration representing the SP Notification Events Page, which is used to register notification events for the Service Provider.

FIG. 27 is an illustration representing the Occasion Registration Page, which is used to maintain multiple distribution lists which are related to specific events, such as a wedding list or baby shower list.

FIG. 28 is an illustration representing the "Wish" List Maintenance Page, which is used to maintain the registrant's "Wish" list of items that they would like to receive.

FIG. 29 is an illustration representing the Marketing Statistics Page, which is used by Service Providers to query the Gift Registry's databases for marketing functions.

FIG. 30 is an illustration representing the Gift Recipient Selection Page, which is used to find the appropriate gift registrant.

FIG. 36 is an illustration representing a sample Reseller Checkout Page, which is found on an SP site of a pre-populated form with the item of interest and indication that this is a gift purchase.

FIG. 37 is an illustration representing a sample Reseller Order Confirmation Page, which is found on an SP site after a purchase has been committed.

FIG. 39 is an illustration representing the Reseller Wish List Registration Page, which allows information to be obtained from the shopper to appropriately register the item with the Gift Registry site.

FIG. 40 is an illustration representing the Locate Registered Occasion Page, which allows user to locate the appropriate registered occasion.

REFERENCE NUMERALS IN DRAWINGS

Figure 1:
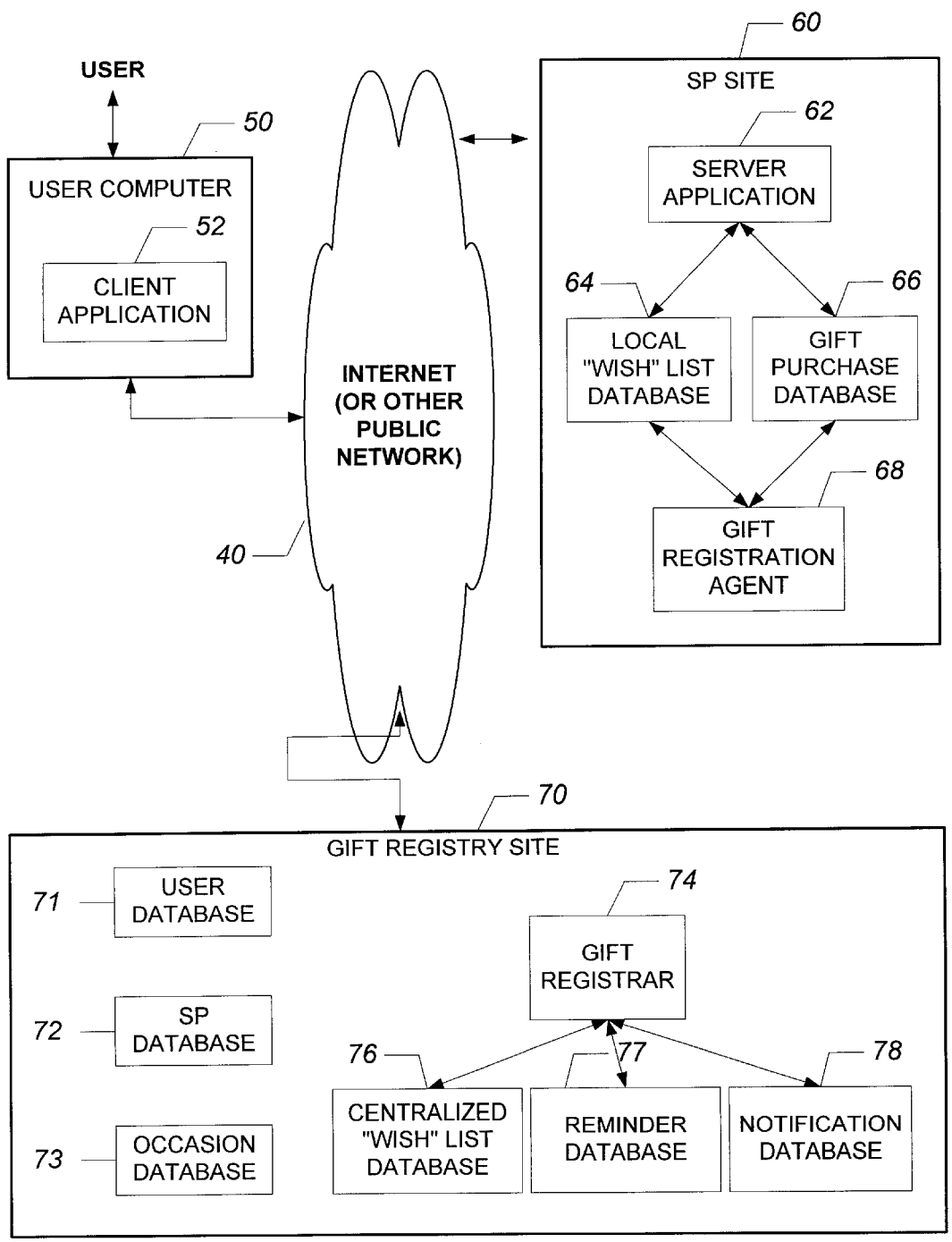
FIG. 1 illustrates the general architecture of a system, which operates in accordance with the present invention.

40 Internet (Or Other Public Network)
50 User Computer
52 Client Application
60 SP Site
62 Server Application
64 Local "Wish" List Database
66 Gift Purchase Database
68 Gift Registration Agent
70 Gift Registry Site
71 User Database
72 SP Database
73 Occasion Database
74 Gift Registrar
76 Centralized "Wish" List Database
77 Reminder Database
78 Notification Database
80 User/SP Locates Gift Registry Site
82 User/SP Makes a Request to Register
84 Determine if User or SP is registering?
90 Gift Registry Displays User Registration Form
92 User Provides Profile Information and Desired Authentication Information
94 Gift Registry site assigns Unique Identifier for the Registrant
96 Gift Registry sends E-Mail Confirmation of Registration to User
100 Gift Registry Displays SP Registration Form
102 SP Provides Profile Information and Desired Authentication Information
104 Gift Registry site assigns Unique Identifier for the SP
106 Gift Registry sends Email Confirmation of Registration to SP Contact
110 User Locates SP Site
112 User Tags Items of Interest
114 User Requests SP Site to Transfer Items of Interest to Gift Registry site
116 SP Site Displays Form for Gift Registry Information
118 User Provides Gift Registry Information
120 SP Site Stores Gift Registration Information for later sending to Gift Registry site
130 User access their Secured Profile
132 User chooses to add an Item to their "Wish" List
134 Gift Registry Site Provides a Form For Adding an Item to the User's "Wish" List
136 User Provides Item Information to Add to Their "Wish" List
138 Gift Registry Site Stores Item Information in the Centralized "Wish" List Database
140 Determine if additional items to register?
142 End Gift Registration Process
150 User Chooses to add a Reminder to their Profile
152 Gift Registry Site Provides a Form for adding a Reminder
154 User Provides Reminder Information to add to their Profile
156 Gift Registry Site Stores Reminder Information with the User's Profile
158 Determine if more Reminder to Register?
159 End Reminder Registration Process
160 Gift Registry System Checks 1st Record in Reminder Database
162 Determine if the Appropriate Event has Triggered?
164 Initialize # of Attempts to Zero
166 Notify User
168 Determine if Notification was Successful?
170 Add 1 to # of Attempts 172 Determine if less than 3 Attempts?
174 Write Notification to Error Log
176 Determine if there are more ReminderS?
178 Gift Registry System Checks Next Reminder
180 End Notification Process
190 User Receives Reminder and Clicks on Specified Link if Given
192 Gift Registry Site Displays Appropriate Information Related to Reminder
194 User Chooses Preferred Reseller and is Re-directed to appropriate SP Site
196 User Chooses Alternate Reseller and is Re-directed to appropriate SP Site
198 Gift Registry Site Transfers Gift Purchase Information
200 SP Site Pre-populates the Checkout Form
202 User Purchases Registered Gift
204 SP Stores Gift Purchase Information for Later Sending to Gift Registry Site
210 User Locates Desired Gift Registrant
212 User Locates Desired Registered Occasion
214 User Identifies Criteria to Filter Gift Registrant's "Wish" List
216 Gift Registry Site Displays the Appropriate "Wish" List Items
218 User Selects Item of Interest and is Shown More Detailed Information
220 SP Accesses Their Secured Profile
222 SP Chooses to View Marketing Statistics
224 Gift Registry Site Provides a Marketing Statistics Page
226 SP Selects Marketing Report Type
228 Gift Registry Site Displays Selected Marketing Report
230 SP Site Establishes Communication Link with Online Gift Registry Site
232 SP Site Sends Gift Registration Package to Online Gift Registry Site
234 SP Site Sends Gift Purchase Package to Online Gift Registry Site
236 Gift Registry Site Sends Acknowledgement of Receipt to SP Site
238 SP Registers Notification Event
240 Gift Registry Site Sends Notification Event on Trigger
242 SP Registers "Sale" Event
244 Gift Registry Site Notifies Interested Registrants of "Sale" Event
250 User Registration Link
255 Merchant Registration Link
260 Log On Link
265 Choose a Gift for Someone Link
270 View Registered Occasion Link
275 Domain Drop-down Menu
280 State Drop-down Menu
285 Country Drop-down Menu
290 User Registration Reset Button
295 User Registration Submit Button
300 Home Page Link
305 System Communication Password Edit Box
310 SP Registration Reset Button
315 SP Registration Submit Button
320 Cancel Authentication Button
325 Submit Authentication Button
330 E-Mail Password Button
335 User Profile Maintenance Link
340 User Reminders Link
345 User Occasion Registration Link
350 User "Wish" List Maintenance Link
355 User Discussion Groups Link
360 SP Profile Maintenance Link
365 SP Notification Events Link
370 SP Marketing Statistics Link
375 SP Discussion Groups Link
380 User Profile Maintenance Reset Button
385 User Profile Maintenance Submit Button
390 SP Profile Maintenance Reset Button
395 SP Profile Maintenance Submit Button
400 Event Type Drop-down Menu
405 Month Drop-down Menu
410 Day Drop-down Menu
415 Year Drop-down Menu
420 Event Description Edit Box
425 Save Reminders Button
430 Notification Method Type Drop-down Menu
435 Event Type Drop-down Menu
440 Condition Type Drop-down Menu
445 Condition Value Edit Box
450 Item Category Drop-down Menu
455 Item Name Filter Edit Box
460 Item UPC Filter Edit Box
465 Preferred Reseller Filter Checkbox
470 SP Notification Submit Button
475 Event Distribution List Section
480 Add Distribution List Button
485 Delete Distribution List Button
490 Modify Distribution List Button
495 Send Notifications Button
500 Gift Registration List Box
505 Add Gift Item Button
510 Modify Gift Item Button
515 Delete Gift Item Button
520 Expand Outline Arrow
525 Collapse Outline Arrow
530 Gift Registrant ID Edit Box
535 Gift Recipient Search Method Radio Group
540 Gift Recipient Search Button
545 Try Gift Recipient Search Again Button
550 Return to Home Button
555 Show Wish List Button
560 Item Details Button
565 Purchase Item Button
570 Find Alternate Reseller Button
575 Recommend Alternate Gift Button
580 Item Name/Description
585 Return to Registrant's "Wish" List Button
590 Item Quanitity Edit Box
95 Shipping Method Drop-down Menu
600 Recalculate Basket Button
605 Credit Card Type Drop-down Menu
610 Credit Card Expiration Month Drop-down Menu
615 Credit Card Expiration Year Drop-down Menu
620 Credit Card Name Edit Box
625 Credit Card Number Edit Box
630 Submit Order Button
635 Add to My Basket Button
640 Add to My "Wish" List Button
645 Transfer My "Wish" List Items Button
650 Gift Registry Promotion Link
655 Gift Registry ID Edit Box
660 Reseller Register "Wish" List Button
665 E-Mail Address Edit Box
670 Look up Gift Registry ID Button
675 Associated Last Name Edit Box
680 City Edit Box
685 Find Occasion Button

DETAILED DESCRIPTION OF THE PREFERRED EMBODIMENTS

A preferred embodiment of the system architecture of the present invention is illustrated in FIG. 1.

1. Overview

The present invention involves a system and method for enabling consumers to register "Wish" list items or items of interest from multiple Service Providers (SPs) over a distributed network. The distributed network may be a unsecured public network such as the Internet. In accordance with the invention, a third-party gift registry provider provides gift registration services for registered Service Providers via an Online Gift Registry Service, eliminating the need for the Service Providers to handle such matters. To make use of the Online Gift Registry, users and Service Providers initially register with the Online Gift Registrar, and are in-turn provided with the software components needed to make use of the services offered by the registrar. These software components, in combination with the Online Gift Registry Service, preferably provide the following features:

1. A single centralized repository of individual "Wish" list items.
2. A registration system used by the SP to send the items of interest to the Gift Registrar for inclusion in the individual's "Wish" list and to associate the SP as the preferred reseller.
3. A reminder system to be used by registrants for automatic messages triggered by user-defined events.
4. A notification system to be used by Service Providers for automatic system notifications triggered by pre-defined events.
5. A "Wish" list viewing system that allows for filtering of items based on, but not limited to, such criteria as category, price range, date of entry, or preferred reseller.
6. A communication system to streamline the purchase process for the gift with the registered and desired SP.
7. A special event "Sale" event used by SPs to market to target audiences that have expressed a desire in the item of interest.
8. A system that can be used to perform marketing queries by the registered Service Providers.

In addition, the Online Gift Registry Service may provide an online user directory of the services of registered Service Providers. This allows users to conveniently determine the identities of the Service Providers that have registered with the Online Gift Registry Service, and reduces the need for the Service Providers to publicly promote their respective online services.

Prior to using the Online Gift Registry Service, users and Service Providers, must register with the Online Registrar. This involves the following steps.

1. The user registers with the Gift Registrar by providing user information (name, address, phone number, etc.) and notice trigger events (holidays, special events, etc.) to the Registrar. The user additionally agrees to a contract, and establishes a personal password that is known only by the user and the Registrar. Additionally, the Registrar assigns a unique ID that will be used by the user to add items of interest to their "Wish" list.
2. The Service Provider registers with the Registrar by providing various business information, and by entering into a contract with the Registrar. The Registrar may investigate the Service Provider on behalf of its registered users prior to accepting the registration. The Registrar issues a password to the Service Provider and provides the Service Provider with the server-side software components of the system.
3. The Service Provider maintains a list of items of interest on behalf of the user and allows the user to either purchase these items or have them transferred to the Online Gift Registry to be added to the user's "Wish" list. The preferred embodiment would make use of online shopping cart technology, which is well known in the field, to maintain these items. The "Wish" list items and the items for immediate purchase may be kept in a single shopping basket or separate shopping baskets. The unique user identifier assigned by the Gift Registrar would be given to the SP and stored with their items of interest.
4. The Service Provider establishes a session with the Online Gift Registry Service, when requested to do so by the user to transfer items of interest to the Gift Registrar. This session may be established over the same distributed network (e.g. the Internet) on which the SP services are provided to registered users, or may be established over a separate private network or communications channel. As described below, the Service Providers and the Online Gift Registry exchange encrypted messages throughout the session for the purposes of updating the users centralized "Wish" list and tagging the item with the SPs unique identifier to establish the SP as the preferred reseller. Alternatively, multiple user items of interest may be accumulated and sent in a batch mode during pre-defined times or set intervals. Another session may be established by the SPs to register "sale" events with the Online Gift Registry Service.

In comparison to existing systems for registering gifts and purchasing registered gifts over the Internet, the present invention provides the following significant advantages:

1. The user registers their "Wish" list of multiple items from multiple merchants in a single centralized location.
2. The user is able to tag items of interest while shopping at SP sites and have the SP transfer the items to their centralized "Wish" list on their behalf.
3. The method of individuals adding items to their "Wish" list is faster and more streamlined.
4. Registrants may be automatically notified upon some future date or event.
5. Purchasers have a wider variety of SPs to chose from when making a gift purchase.
6. Purchasers can filter items in the registrant's "Wish" list based on different criteria such as reseller and cost among others.
7. Merchants can target "sale" items to an interested audience.

The system and method of the present invention are advantageously suited for use over a public network such as the Internet due to its widespread availability. (When used in herein in conjunction with "network", the term "public" is intended to imply that user access to the network is not controlled by or limited to a particular business entity or group of business entities. Likewise, the term "distributed" implies that processing capabilities and services are spread out among different nodes of the network—as opposed to being centralized within a single host, server or LAN—with different nodes providing different services.) In general, however, the system and method can be used on any type of distributed network over which online services are provided by Service Providers to end users, including both public and private, and hybrid public-private networks.

To facilitate a complete understanding of invention, the remainder of the detailed description is arranged as follows: The basic components and features of the preferred embodiments will be initially be described with reference to FIG. 1 under the heading GENERAL ARCHITECTURE. Registration of users and Service Providers will be described with reference to FIG. 2 under the heading USER AND SERVICE PROVIDER REGISTRATION PROCESS. The updating of registrant's "Wish" list is described with reference to FIGS. 3 and 4 under the heading USER "WISH" LIST UPDATING PROCESSES. The registering, triggering, and response of reminders and notification events are described with reference to FIGS. 5 through 7 under the heading REMINDER AND NOTIFICATION EVENT PROCESSES. The Gift Purchase process is described with reference to FIG. 8 under the heading GIFT PURCHASING PROCESS. The Marketing Statistics process is described with reference to FIG. 9 under the heading MARKETING PROCESSES. The communication messages are described with reference to FIGS. 10 and 11 under the heading COMMUNICATION PROCESSES.

8. General Architecture (FIG. 1)

FIG. 1 illustrates the basic components of a system, which operates in accordance with the present invention. Registered users (also referred to as "consumers" or "registrants") connect to the Internet 40 (or other distributed public network) via user computers 50 to register items of interest from SP services available on multiple SP sites 60. The SP sites 60 communicate with an Online Gift Registry 70 to register items of interest on behalf of the user's request and (optionally) identify "sale" events to targeted audiences of individuals.

The registered users may connect to the Internet 40 in any known manner. For example, the users may use a suitable online services network to obtain access to the Internet, or may connect by establishing an account with an Internet Service Provider (not shown). Each user computer 50 includes at least one client application 52 (such as a World Wide Web browser) for communicating with server applications on the Internet 40.

The SP services are provided on the individual SP sites 60 of registered Service Providers. Each SP site 60 will typically comprise one or more physical servers that are connected to the Internet 40. Each SP site 60 runs at least one server application 62 for providing an online service. A given Service Provider or SP site 60 may, of course, provide multiple online services. Some of these services may be non-commerce-related services that are provided for free. For purposes of the following description, it may be assumed that the term "SP service" refers only to fee-based services. Additionally, it may be assumed that the term "registrant" and the term "Service Provider" refers only to registered users and Service Providers respectively. The term "gift purchasers" may refer to registered users or non-registered users.

Although the user computers 50 and the SP sites 60 are shown as being directly connected to the Internet 40, it should be understood that such connection may be via one or more private networks. For example, a user computer 50 may connect to the Internet 40 via a wireless connection or via a private cable televisions network using a cable modem. Likewise, an SP site may connect to the Internet via a private network of the Service Provider's organization.

SP sites 60 may offer various types of services. These services may include retail merchandise, as well as digital products and/or informational or subscription-based services. For example, one Service Provider may offer clothing products for sell, another one sporting goods, while still another one downloadable software. Other SP services may include, for example, investment advice services, electronic publications, travel-related services, or consultation. It is anticipated that as user access speeds to the Internet increase, higher bandwidth services such as interactive games, movies-on-demand, and hi-fi audio will be made available.

The Service Providers are free to offer any product or service that they desire and are free to select any appropriate method of payment for their services rendered. For example, items of interest may include a given amount of time on a given service, or, in the case of a publication subscription or software download, a one-time fee.

With further reference to FIG. 1, each SP site additionally includes a local "Wish" list database 64. The local "Wish" list database 64 is preferable in the form of an electronic software shopping cart which includes the necessary logic for manipulating the items and distinguishing them from items that are for immediate purchase. This may take the form of a single or two separate shopping carts. This $2^{nd}$ shopping basket is commonly referred to as the shopper's basket.

Upon the user's request for the transfer of the items of interest to their centralized "Wish" list, the SPs Gift Registration Agent 68 sends the items of interest from the Local "Wish" list database 64 to the Gift Registry site 70. The Gift Registration Agent 68 server components are preferable in the form of software modules which include the necessary logic for sending the items in an encrypted format, and for forwarding "sale" events (generated by the server application) to the Gift Registry Site 70.

These items are then added by the Gift Registrar 74 to the record associated with the user identified by the unique pre-assigned identifier in the Centralized "Wish" List Database 76.

The Gift Registry site 70 preferably comprises one or more physical servers that run a Gift Registrar application 74 to implement the Gift Registry Service. The site 70 is preferably operated by a single business, or a small collection of businesses, that are qualified to perform gift registration and notification services on behalf of users and Service Providers. As described below, the Gift Registry Site 70 may communicate with the SP sites 60 (to provide targeted audiences interested in items of interest) either via the Internet (or other public network), a private network, a private communications channel, or a combination thereof.

Although a single Gift Registry site 70 is shown in FIG. 1, it will be recognized that multiple Gift Registry sites could be provided on the Internet 40. For example, Gift Registry sites may be set up at several different geographical locations to accommodate SP sites 60 located in different regions. Additionally, as with the user computers 50 and the SP sites 60, the Gift Registry site 70 may be connected to the Internet 40 via one or more private networks.

The Gift Registry site 70 includes one or more physical databases for storing various account information with respect to the users and Service providers. This information preferably includes the passwords and profiles.

Reminders are stored in the Reminder Database 77 of the Gift Registry site 70 and are associated with the registrants that registered them.

Notification events are stored in the Notification Database 78 of the Gift Registry site 70 and are associated with the Service Providers that registered them.

Upon the purchase of a gift item, the SP server application 62 stores the associated information in the Gift Purchase Database 66 for later transferring by the Gift Registration Agent 68 to the Gift Registrar 74 at the Gift Registry Site 70. The Gift Registrar 74 would be responsible for updating the appropriate registrant's profile of the purchase information.

Finally, the brokering site 70 may store, and make available to the service Providers, certain user-specific customization information that can be used by the Service Providers to tailor their respective services to individual users. This information may include, for example the number of users that registered an item of interest. In addition, target audience lists may be automatically sent to the Service Providers upon reaching some threshold for an item of interest. For example, an SP may register to be notified when 100 individuals register a particular item of interest. The SP may then use this list to perform marketing activities to those individuals who did not opt out of agreeing to receive marketing information. Such information may be specified by the user upon registration with the Online Gift Registry, and/or may be interactively specified or updated by the user via a connection between the user computer 50 and the Gift Registry site 70.

The marketing information may be provided to the Service Providers (by the Gift Registry Site 70z) either automatically by registering a notification event, or in response to queries from the Service Providers or canned reports available online. The Service Providers can use this information to customize their respective online services to individual users. For example, a SP site my use the marketing information to make highly popular items more visible on their site and offer special rates to entice customers to buy. As will be recognized by those skilled in the art, the Gift Registry Site 70 can store many different types of customized and marketing information.

9. User and Service Provider Registration Process (FIG. 2)

Figure 2:
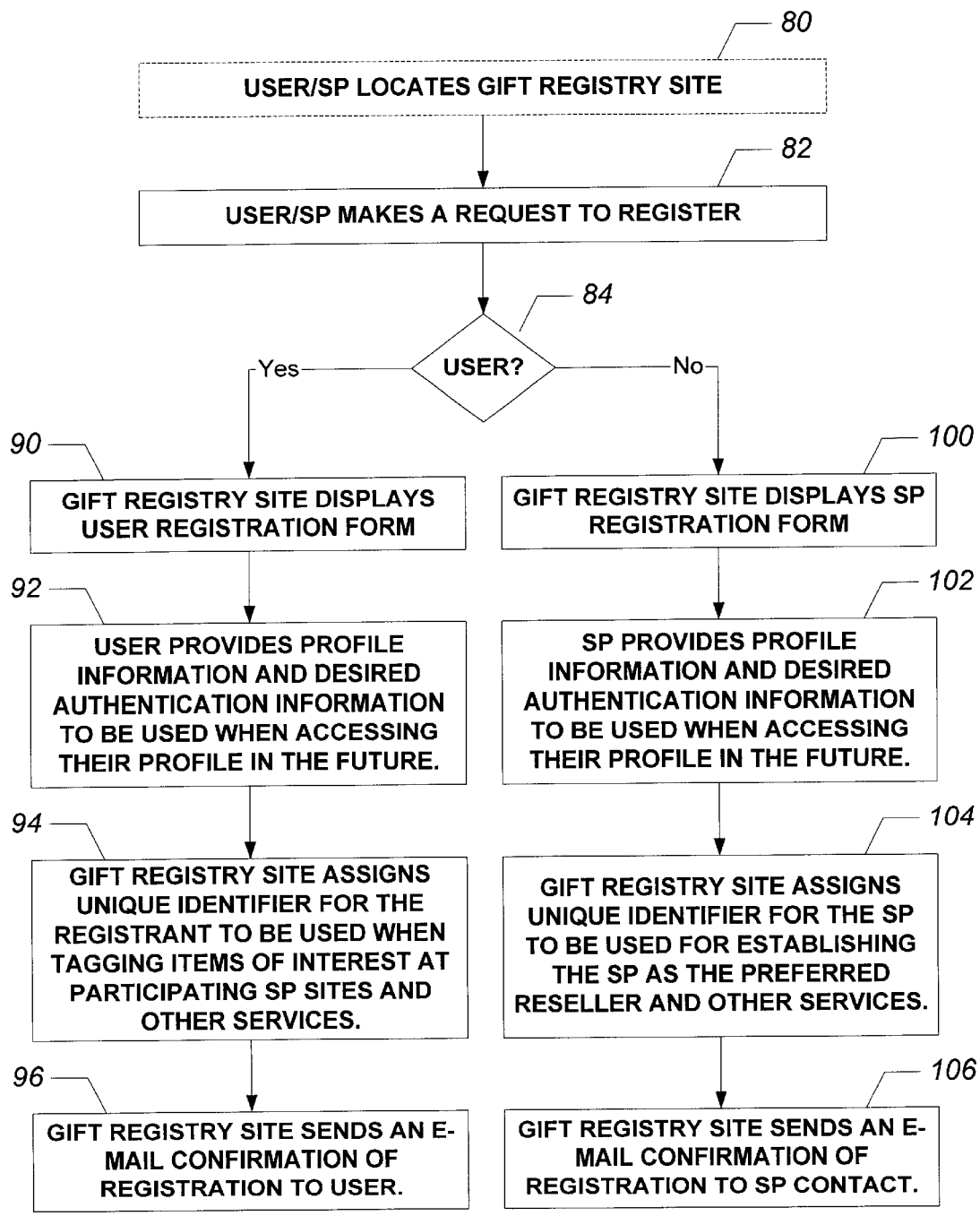
FIG. 2 is a flow chart representation of the steps taken by a new user or Service Provider to register with the gift registry system in accordance with the present invention.

FIG. 2 illustrates the basic steps that take place, in accordance with the invention, when a user or a Service Provider respectively registers at the Gift Registry site 70. In FIG. 2, the box shown in dashed lines represents an optional step, which may or may not be performed (depending upon the particular actions taken by the user or Service Provider)

With reference to block 80 in FIG. 2, the user initially locates the Gift Registry Service by obtaining the location information of the corresponding Gift Registry site 70. This location information may be in a variety of forms, such as a Uniform Resource Locator (URL), a Domain Name Service (DNS) name, or an Internet Protocol (IP) address.

With reference to block 82, if a user makes a request to register with the Gift Registry system, the system displays 90 the User Registration Page FIG. 16. They then provide 92 profile information and an associated password and password hint to be used when accessing their profile in the future. The password hint is displayed to the user if they forget their password. If they are still unable to log-in to their profile, then they can request that an email message be sent to their registered email address with the associated password. This is a standard practice used on online sites to assist the user in remembering their password for access to the site. A $2^{nd}$ password may be used to allow SP sites to authenticate that the Gift Registry Identifier belongs to the gift registration requester. Thus, the user may have a master password and a registration password. The Gift Registry system assigns 94 a unique identifier to be used when they tag items of interest at a participating SP site 60. Upon the storing of the new registrant profile, the Gift Registry system will send 96 an e-mail confirmation of the registration to the user.

The Service Provider follows an identical registration process as the user except the system displays 100 the SP Registration Page FIG. 18. Likewise, block 102 for the SP is similar to block 92 for the user in providing profile information, password, and password hint although there will be some differences in the type of information and the approval process. Similarly, an SP is assigned a unique identifier to associate it as the preferred reseller in block 104. In addition, the SP also receives an email confirmation of their registration in block 106.

10. User "Wish" List Updating Processes (FIGS. 3, 4)

Figure 3:
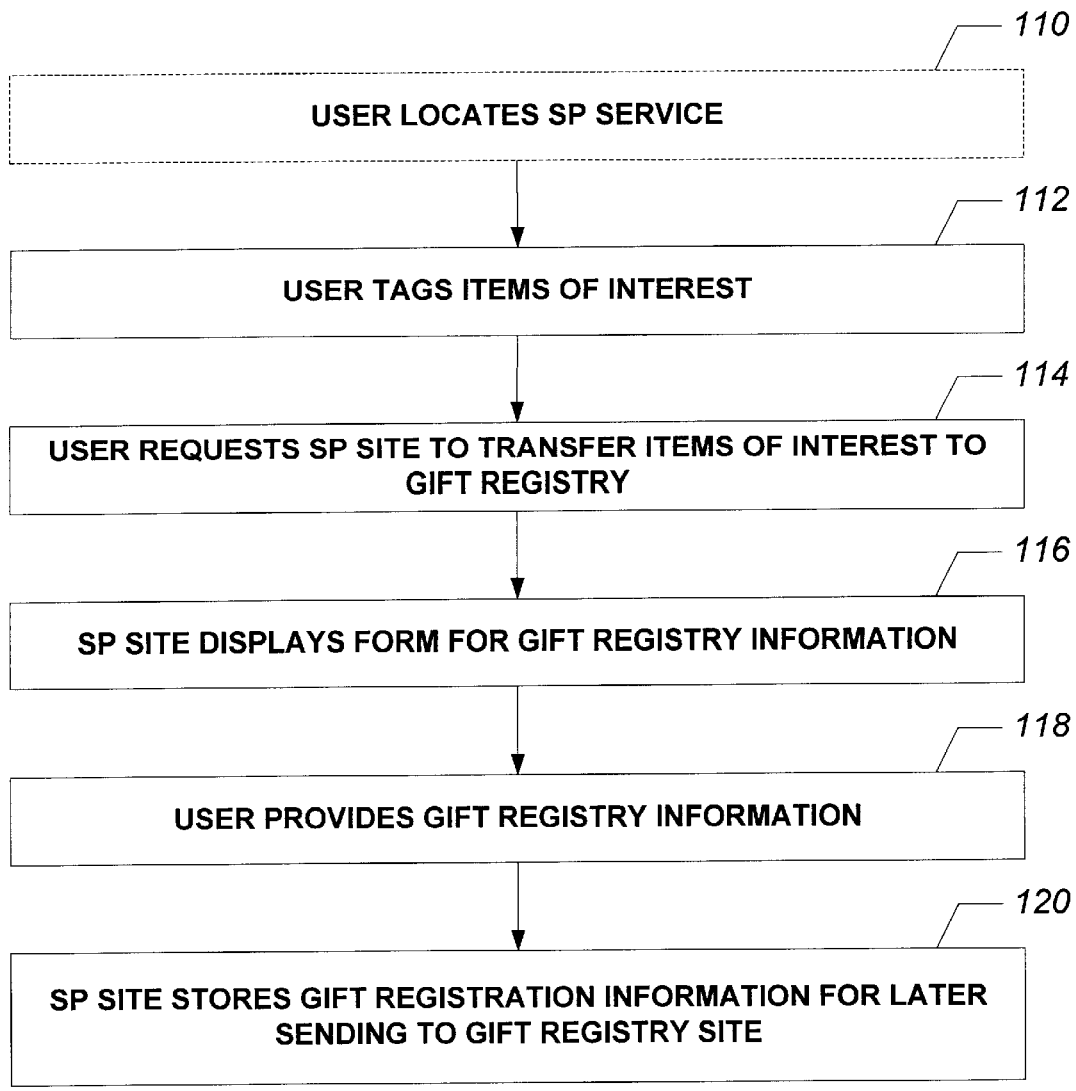
FIG. 3 is a flow chart representation of the steps taken by a registrant user to add items to their "Wish" List while visiting Service Provider sites.

The preferred gift registration process is illustrated in FIG. 3, in which the User locates 110 an SP Service by obtaining the location information of the corresponding SP site 60. As indicated earlier, this location information may be in a variety of forms, such as a Uniform Resource Locator (URL), a Domain Name Service (DNS) name, or an Internet Protocol (IP) address. The user may optionally obtain this information about a participating SP via a link on the Gift Registry site 70. Of course, the user may already have this information from a previous session, or may obtain this information using another Internet directory service or search engine. While browsing the SPs site, the user tags 112 items of interest and later requests 114 the SP site 60 to transfer the items of interest from the SPs local "Wish" list database 64 to the Centralized "Wish" List Database 76. The SP site 60 then asks 116 the user for the appropriate gift registry information, which includes but is not limited to their Gift Registry Identifier and registration password. This step may not be necessary if the SP maintains the shoppers Gift Registry ID in their profile that has previously been set up. After the user provides 118 the appropriate Gift Registry information, the SP Server Application 62 stores the Gift Registration Information for later sending 120 to the Gift Registration site 70. The SP site will periodically batch 232 up multiple gift registrations from multiple users for communication to the Gift Registry site in an efficient manner. At a later time, this connection may be more real-time if deemed more efficient.

Figure 4:
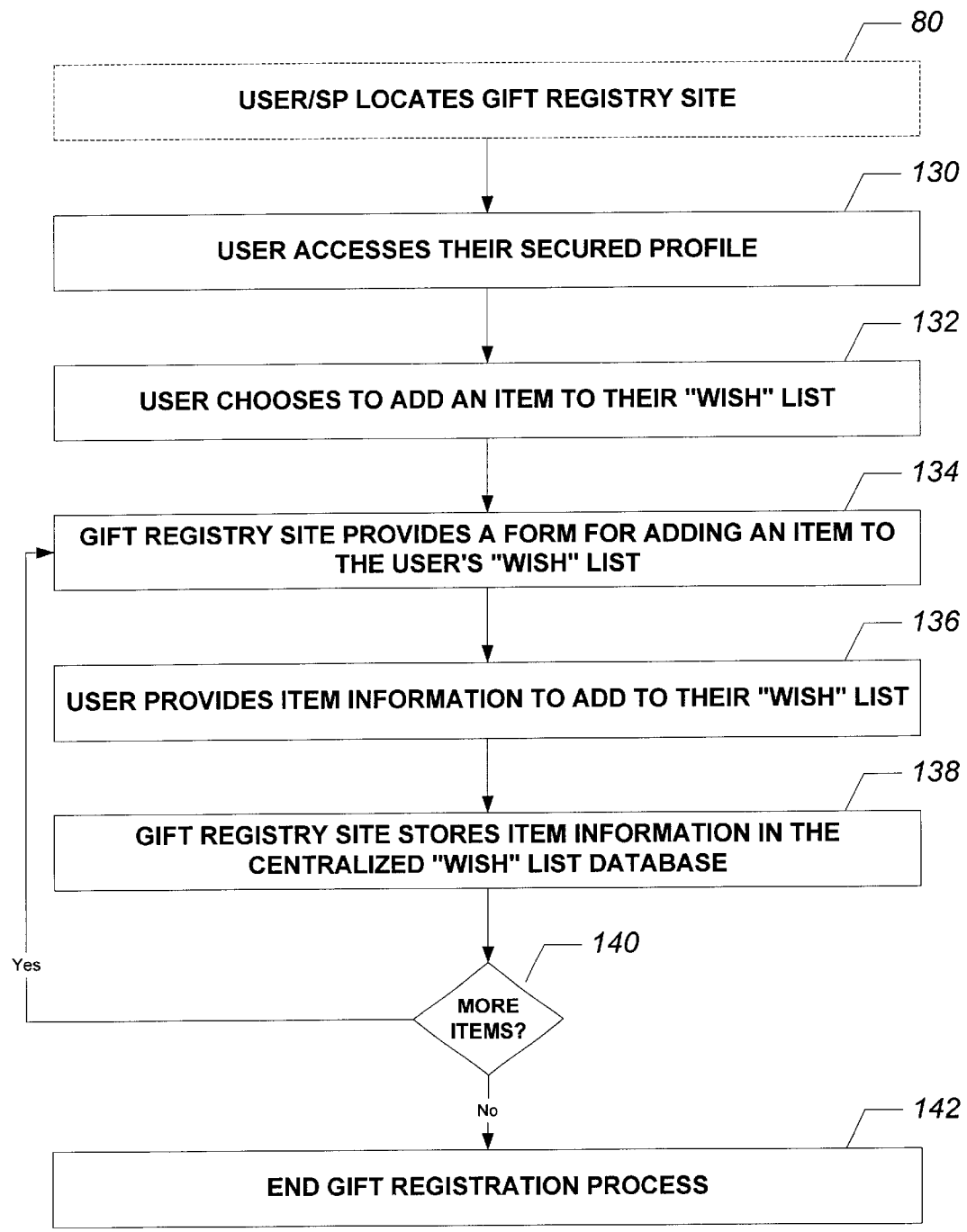
FIG. 4 is a flow chart representation of an alternate method of the steps taken by a registrant user to add items to their "Wish" List directly with the gift registry system.

An alternate gift registration process is illustrated in FIG. 4, whereas the user registers their gifts directly with the Gift Registry site 70, by first visiting 80 the site and.clicking on an appropriate link. The user then accesses 130 their secured profile after submitting their user authentication information. The Gift Registry system then provides the "Wish" List Maintenance Page FIG. 28 for adding 134 an item to the user's "Wish" list. Once the user enters 136 the item information and the input fields are validated, the information is stored 138 in the Centralized "Wish" List Database 76. This process can be repeated 140 as many times as necessary. When there are no more items to add, the process is complete 142.

Figure 5:
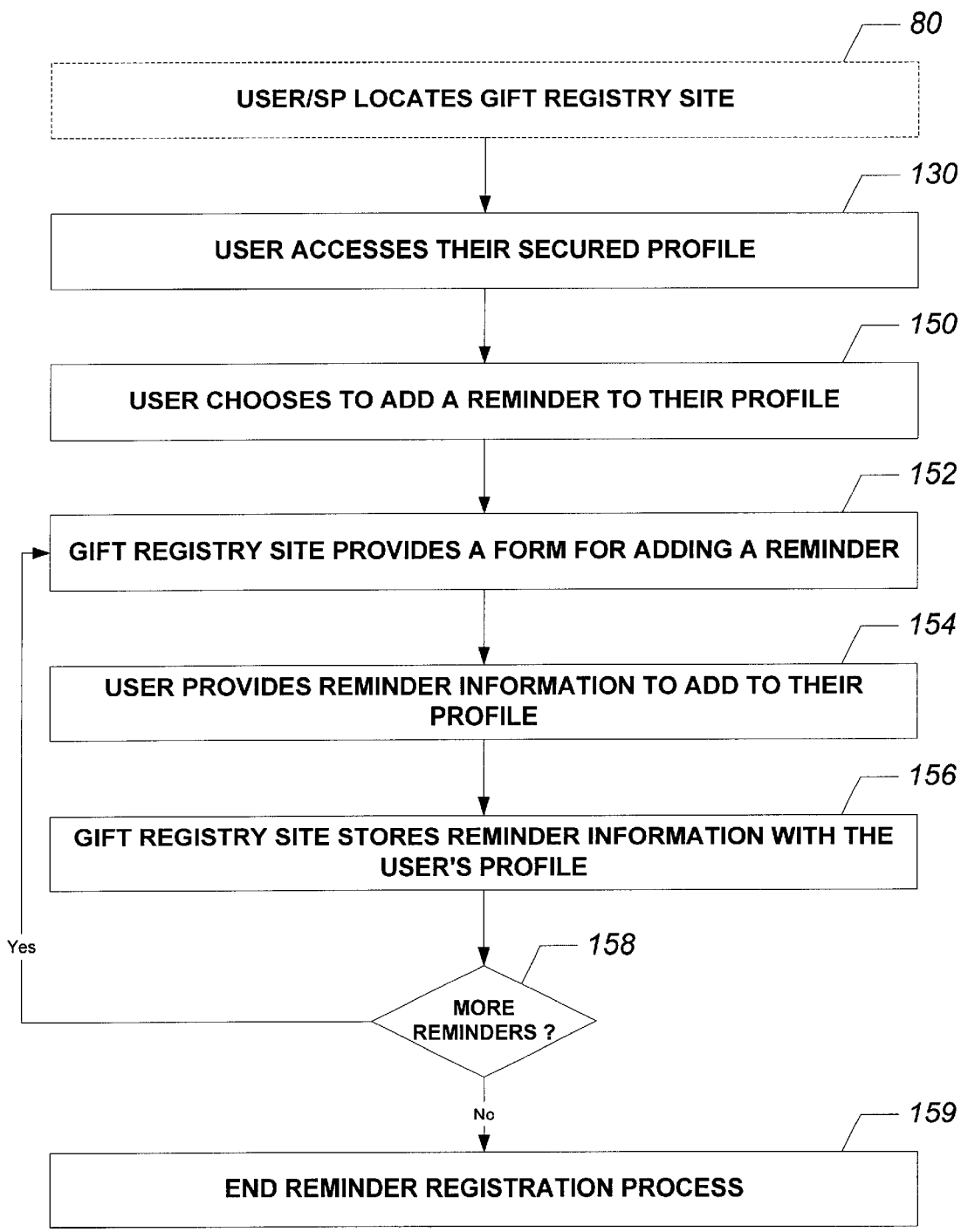
FIG. 5 is a flow chart representation of the steps taken by a registrant user to be notified of future events.

11. Reminder and Notification Event Processes (FIGS. 5, 6, 7)

Users register to be notified of events by first locating 80 the Gift Registry site. The user accesses 130 their secured profile by providing their Gift Registry Identifier and associated password, and is then able to add a reminder to their profile 150 by clicking on an appropriate link. They will then be provided 152 the User Reminder Page FIG. 25 for registering 154 notification events of which the Gift Registry System stores 156 with their user profile in the Reminder Database 77. This process is repeated 158 as many times as necessary for the user. When there are no more reminders, the process is complete 159.

Figure 6:
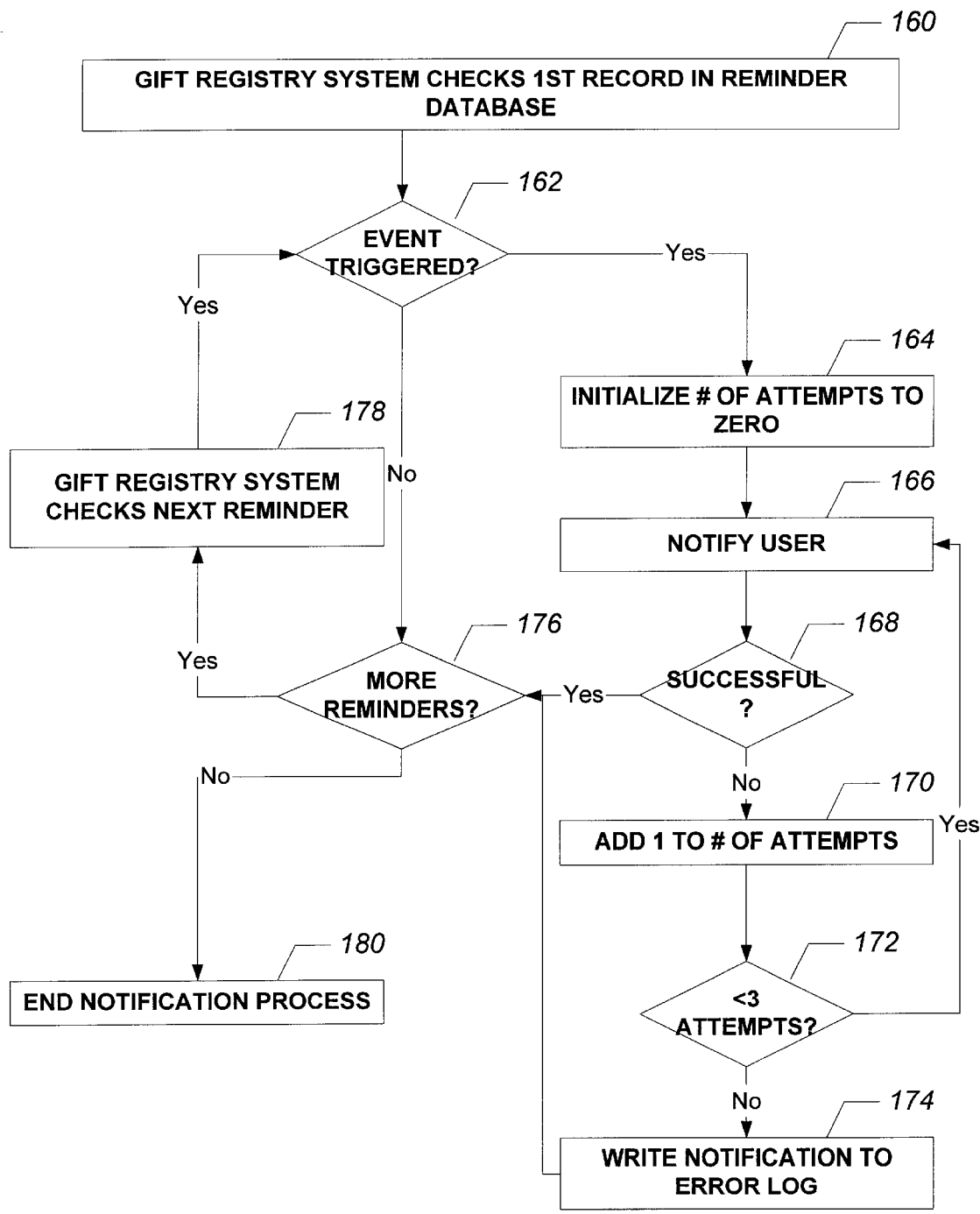
FIG. 6 is a flow chart representation of the steps taken by the gift registry system to check user reminders and SP notifications for the triggering of registered events.
Figure 7:
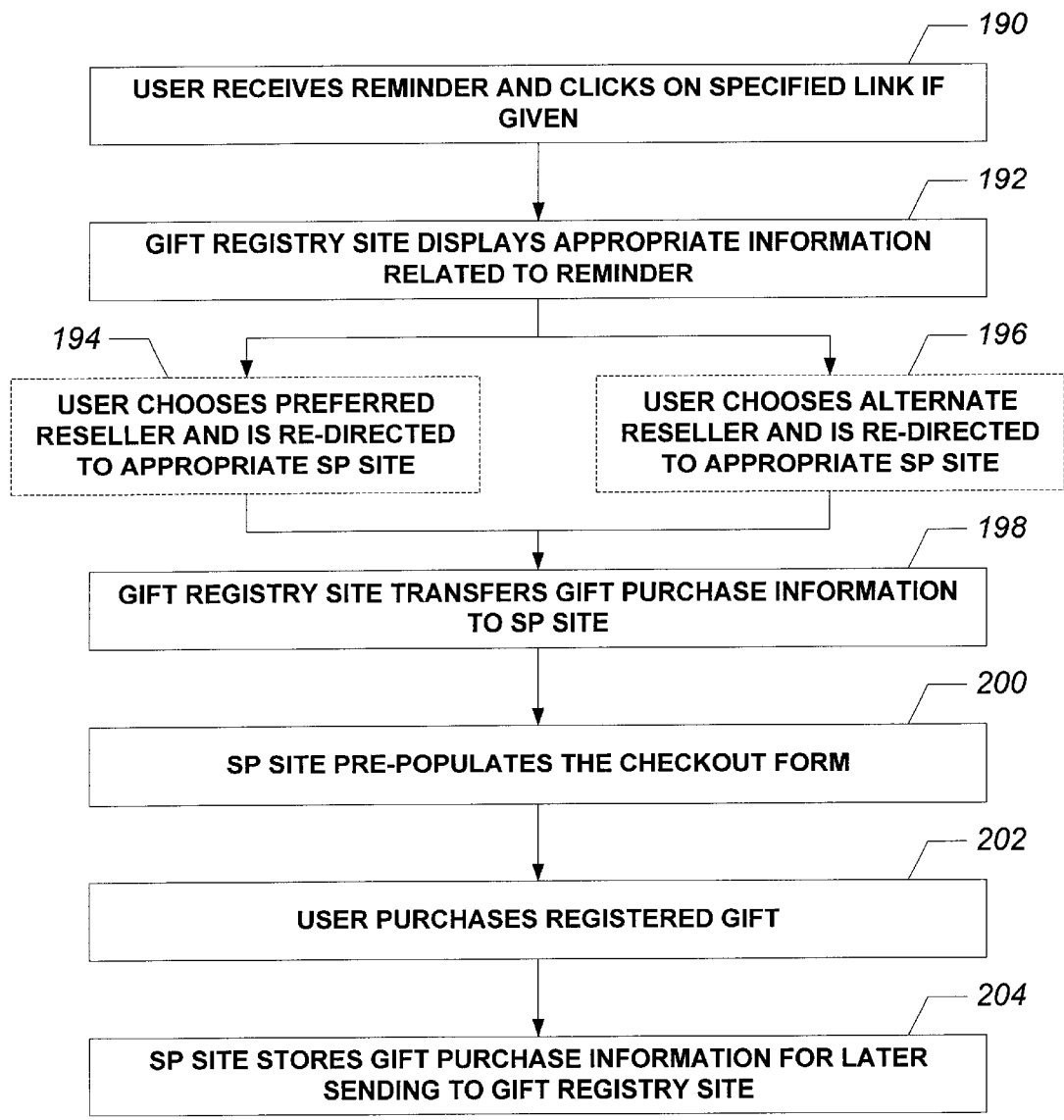
FIG. 7 is a flow chart representation of the steps taken by a user upon receiving a reminder from the gift registry system.

With reference to FIG. 6, a batch process of the Gift Registry system is periodically fired up based on a pre-defined schedule. The process begins by checking 160 the 1t record in the Reminder Database 77 and determining 162 whether an event has triggered. If the event has triggered, then the number of attempts of notifying the user is initialized 164 to zero and then the system tries to notify 166 the user with the appropriate message. If the notification is not successful 168 then the system adds 170 one to the number of attempts and tries again at a later time. If after three unsuccessful attempts 172, the system will write 174 a message to an error log.

If successful, the system will mark the reminder as being successful and will not attempt to send it at some later time unless it is a re-occurring event. This process will be repeated for each record in the Reminder Database 77.

The preferred embodiment for a notification is an email message, but this invention is not limited to that method of notification. Some other methods of notification may be faxes, pagers, telephones, or postal telegrams.

In regards to FIG. 7, in the preferred method of an email reminder, a link will be provided to an HTML page with additional detail information if appropriate for that event. If a link is provided and the user activates 190 the link, then the Gift Registry site 70 displays 192 the detailed information, which includes the preferred reseller. At this point, the user may choose 194 either the preferred reseller or choose 196 an alternate reseller. If they choose to search for an alternate reseller, they will be presented with alternate methods of determining a different reseller from the preferred reseller based on some other criteria such as name recognition or lowest price. There are many alternatives here that are not limited to those specified.

Once the user chooses the appropriate reseller and clicks on the provided link, the gift information and the associated gift registrant identification are transferred 198 to the SP site 60. The SP site then provides 200 a checkout form such as depicted in FIG. 36 with the pre-populated gift information of the Gift Registrant. The user then goes through the checkout process of the SP site 60, providing any required billing information and submits their request for purchase. Upon the gift purchase 202, the SP Server Application 62 stores the resulting information in the Gift Purchase Database 66 for latter transmittal to the Gift Registrar 74 by the Gift Registration Agent 68.

The process for checking SP notifications is identical to FIG. 6 except that the Notification Database 78 is used instead of the Reminder Database 77. The scheduling of these two checks is independent and can occur at different times and on different frequencies of operation.

12. Gift Purchasing Process (FIG. 8)

Figure 8:
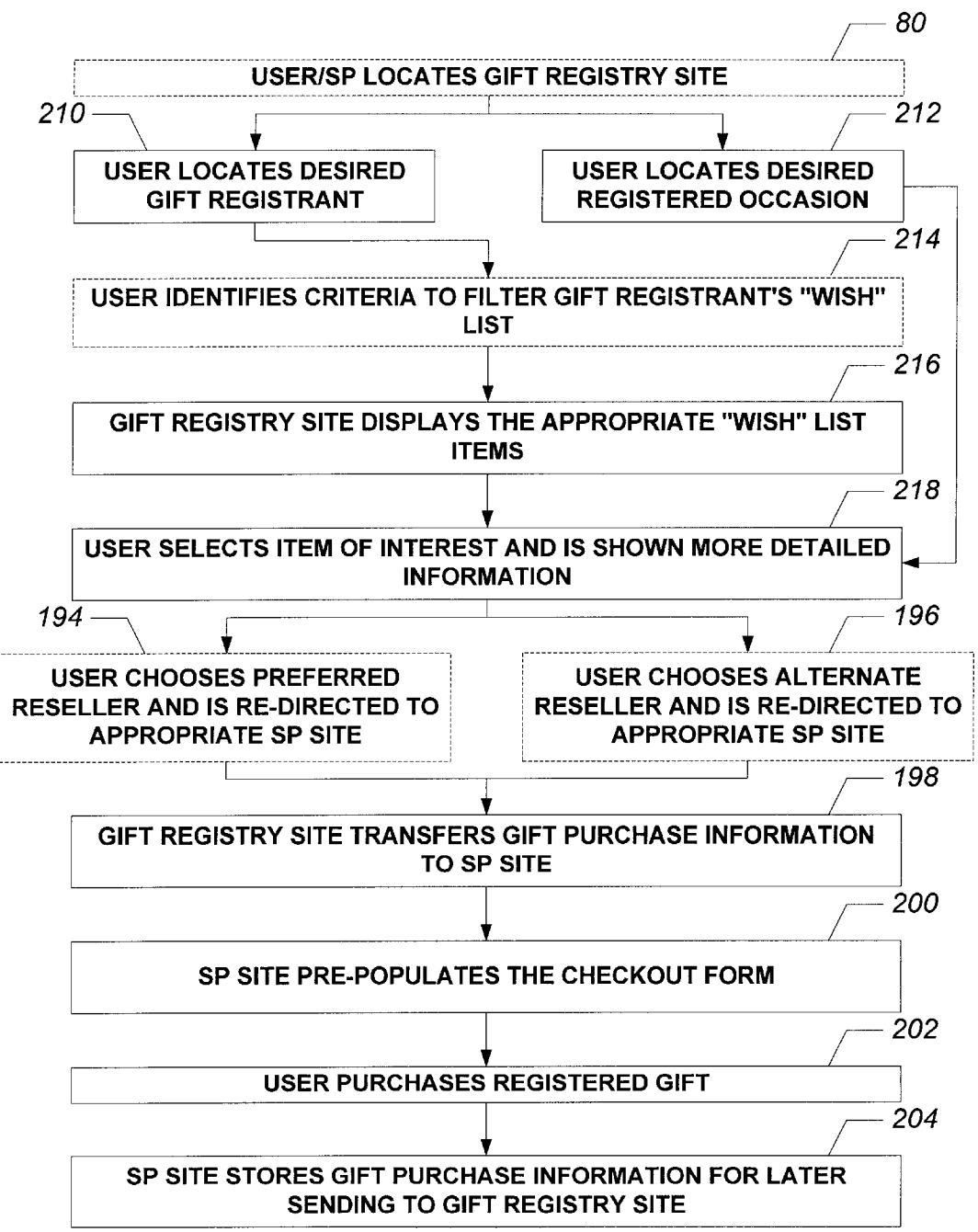
FIG. 8 is a flow chart representation of the steps taken by a gift purchaser of the gift registry system in accordance with the resent invention.

In FIG. 8, the potential gift purchaser locates 80 the Gift Registry site 70. The gift purchaser then either locates 210 the desired gift registrant that they desire to purchase a gift for or locates 212 the desired registered occasion. Upon locating the correct gift registrant, the gift purchaser optionally identifies 214 criteria that they wish to use to filter the entire "Wish" list. Some potential criteria may be price range or category or reseller. The Gift Registry site 70 displays 216 the appropriate "Wish" list items for the selected gift registrant. The gift purchaser then selects 218 an item of interest to be shown more detailed information. The alternate path to this point is by the user selecting the event after locating 212 a desired occasion. At this point, the gift purchaser can optionally chose one of two paths. They may either choose 194 the preferred reseller and be re-directed to the preferred reseller site or chose 196 an alternate reseller and be re-directed to the alternate reseller site. Either way, the Gift Registry Site 70 transfers 198 the gift purchase information to the appropriate SP site 60. Since the SP site 60 recognizes that this is Gift Purchaser referred by the Gift Registry site 70, it displays 200 a pre-populated checkout form such as depicted in FIG. 36 with only the item or items of interest that was selected 218 at the Gift Registry site 70. The SP site 60 provides a special posting page for gift purchases from the Gift Registry site 70, which includes the Gift Registry ID of the registrant that a gift is being purchased for. This Gift Registry ID is later used when updating the registrant's wish list with items purchased. For privacy reasons, the Gift Registrant's shipping information will be associated with the order but not displayed to the purchaser. The user then goes through the checkout process of the SP site 60, providing any required billing information and submits their request for purchase. Upon the gift purchase 202, the SP Server Application 62 stores the resulting information in the Gift Purchase Database 66 for latter transmittal to the Gift Registrar 74 by the Gift Registration Agent 68.

13. Marketing Processes (FIG. 9)

Figure 9:
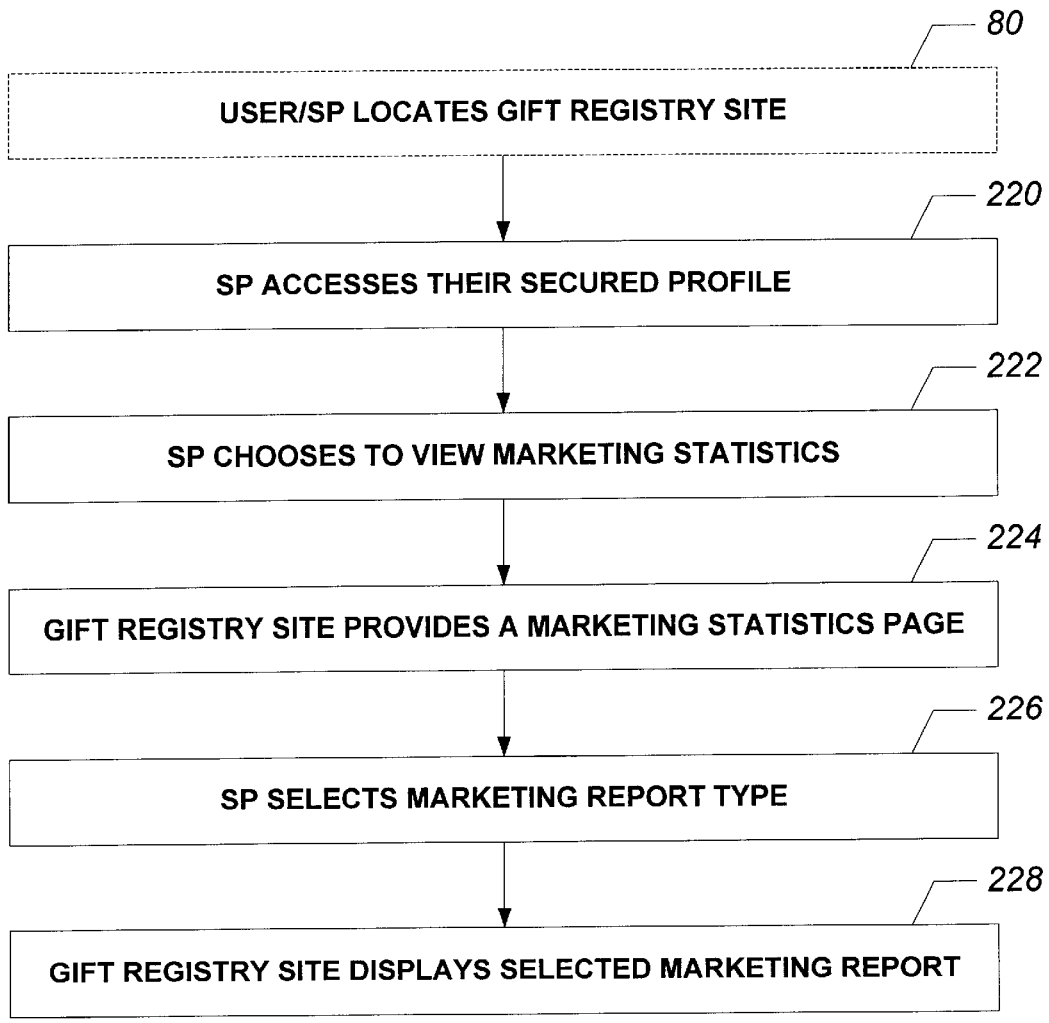
FIG. 9 is a flow chart representation of the steps taken by the Service Provider to perform marketing queries at the gift registry site.

With reference to FIG. 9, the Service Provider locates 80 the Gift Registry Site 70 and logs on 220 with their pre-assigned unique identifier and password. From the SP Main Page FIG. 22, the SP may choose 222 to view Marketing Statistics. If they so choose, they are then shown 224 a page which lists various types of reports available as depicted in FIG. 29. The SP then selects 226 a report type and the Gift Registry site displays 228 the selected marketing report.

Figure 10A:
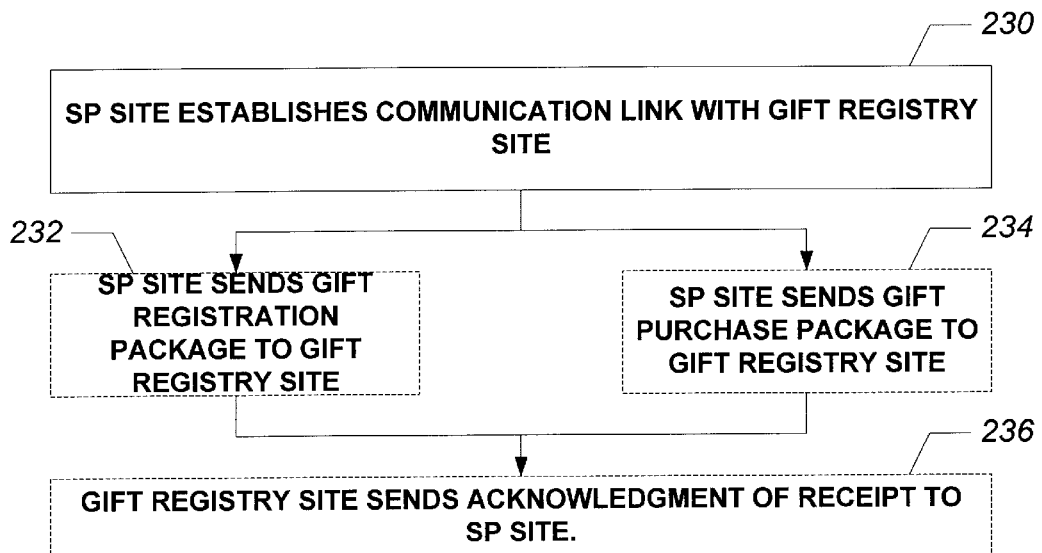
FIGS 10A and 10B is a flow chart representation of the steps taken by the Service Provider site to register updates to user "Wish" lists, gift purchases, notification events, and "sale" events.
Figure 10B:
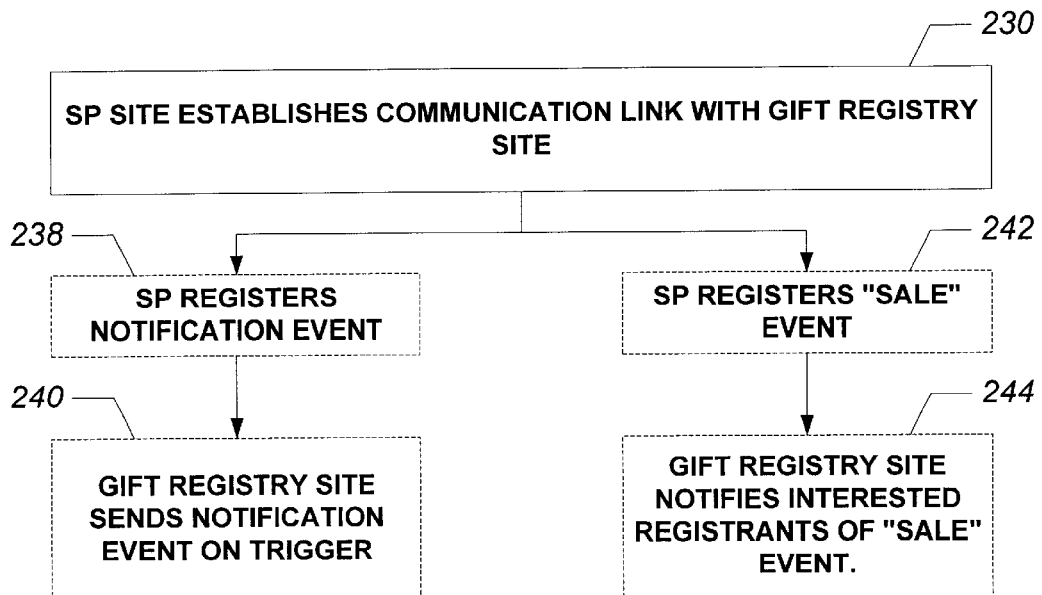
Figure 11:
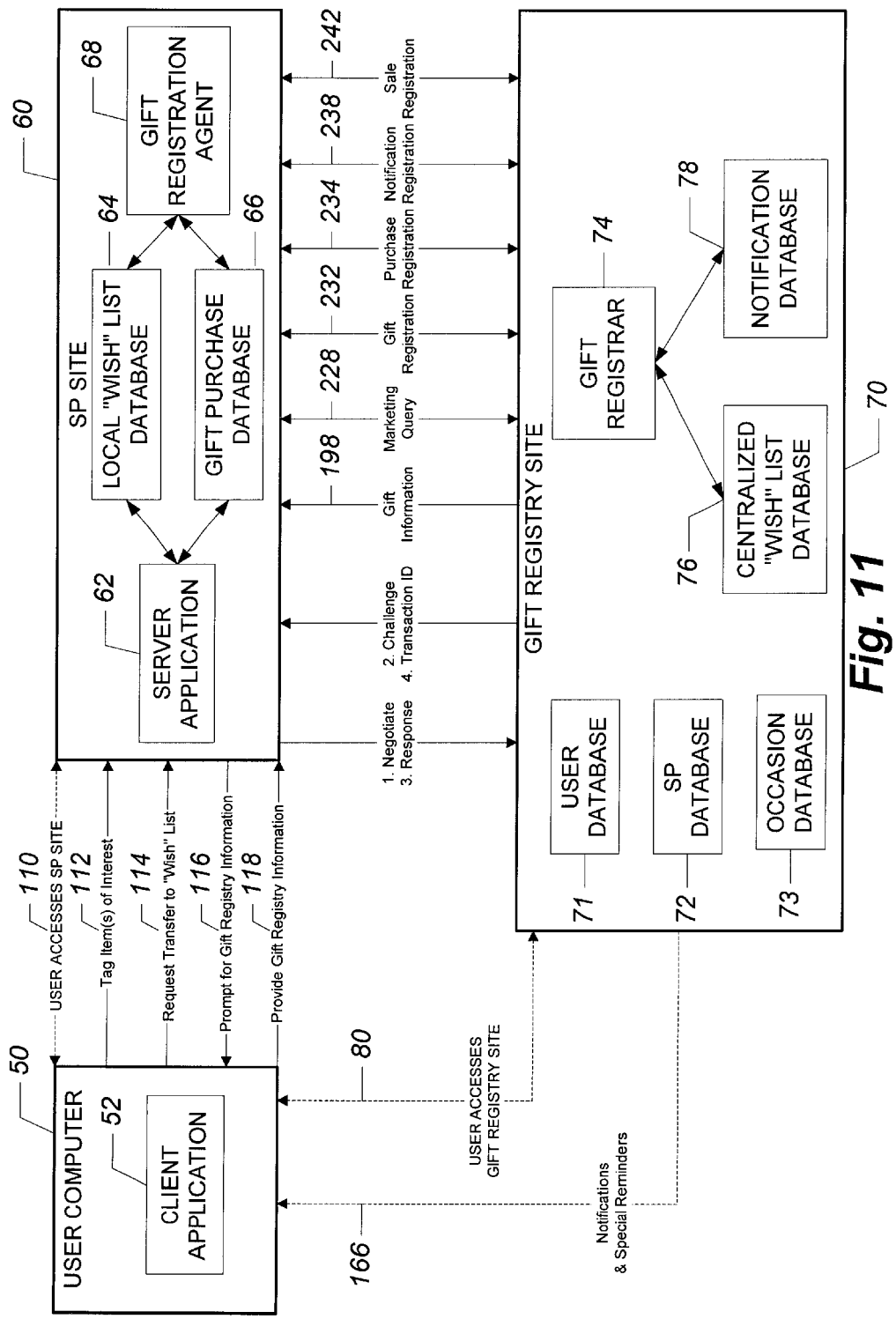
FIG. 11 illustrates the communications, which take place between the User, Service Provider (SP) and the Gift Registry to register items of interest on behalf of the user.

14. Communication Processes (FIGS. 10, 11)

A SP site must first establish 230 a communication link with the Gift Registry site. This involves the transmission of a "negotiate" message from the SP Site Server 60 to the Gift Registry site 70. This negotiate message includes the SP's unique ID, which may be in the form of a digital certificate. The Gift Registrar 74 on the Gift Registry Site 70 responds to the negotiate message by sending a pseudo-random "challenge" message to the SP's Gift Registrant Agent 68.

In response to the challenge message, the Gift Registration Agent 68 software generates and returns a cryptographic "response" message, which is based on both the challenge message and the SP's password.

The above-described method of requesting authentication is commonly referred to as a "challenge-response authentication" protocol and is widely understood in the industry. For more detailed information, see Rivest, R., "The MD4 Message Digest Algorithm," Proceedings, Cryptop '90, Springer-Verlag, August 1990. For a description of other cryptographic algorithms which may be used, see Stallings, W., *Network and Internetwork Security*, Prentice Hall, 1995.)

With reference to FIG. 10, if the SP site is successfully authenticated, the Gift Registration Agent 68 may perform one of four actions. The first action that may be performed is the sending 232 of a Gift Registration Package to the Gift Registrar 74 of the Gift Registry Site 70. This package may contain multiple "Wish" list items associated with multiple gift registrants. Likewise, the second action 234 is similar to the first except that gift purchases are sent instead of wish list registrations. Upon receiving the package, the Gift Registrar 74 sends an acknowledgement 236 to the SP site.

If a SP registers 238 to be notified if an event occurs, and after a passage of time that event occurs, they will be sent 240 a notification event that the SP server application 62 may use for targeted marketing.

If a SP registers 242 a "sale" event with the Gift Registry site, then all registered users interested in that event will be automatically notified of that event 244 occurs. The preferred embodiment would be an email notification with the appropriate item information and a link to the preferred reseller sent by the Gift Registry site 70. This link would display the SP's checkout page as defined above. An alternative embodiment may be a list of interested individuals, who haven't opted out, sent to the SP server application 62, which can then be used for special marketing email servers at the SP site 60.

In FIG. 11, the numbered arrows between the SP site 60 and the Gift Registry site 70 represent messages transmitted over the Internet 40 as part of the authentication sequence, with the numbers 14 indicating the order in which these messages are passed. The dashed arrows in FIG. 4 represent optional exchanges of information, which are separate from the messages of either the gift identification process or the authentication process.

OPERATION—MAIN EMBODIMENT

The operation of the invention is shown in FIGS. 12–41, each of which shows a computer screen appearing to the operator.

1. Basic Process Flow (FIGS. 12–14)

Figure 12:
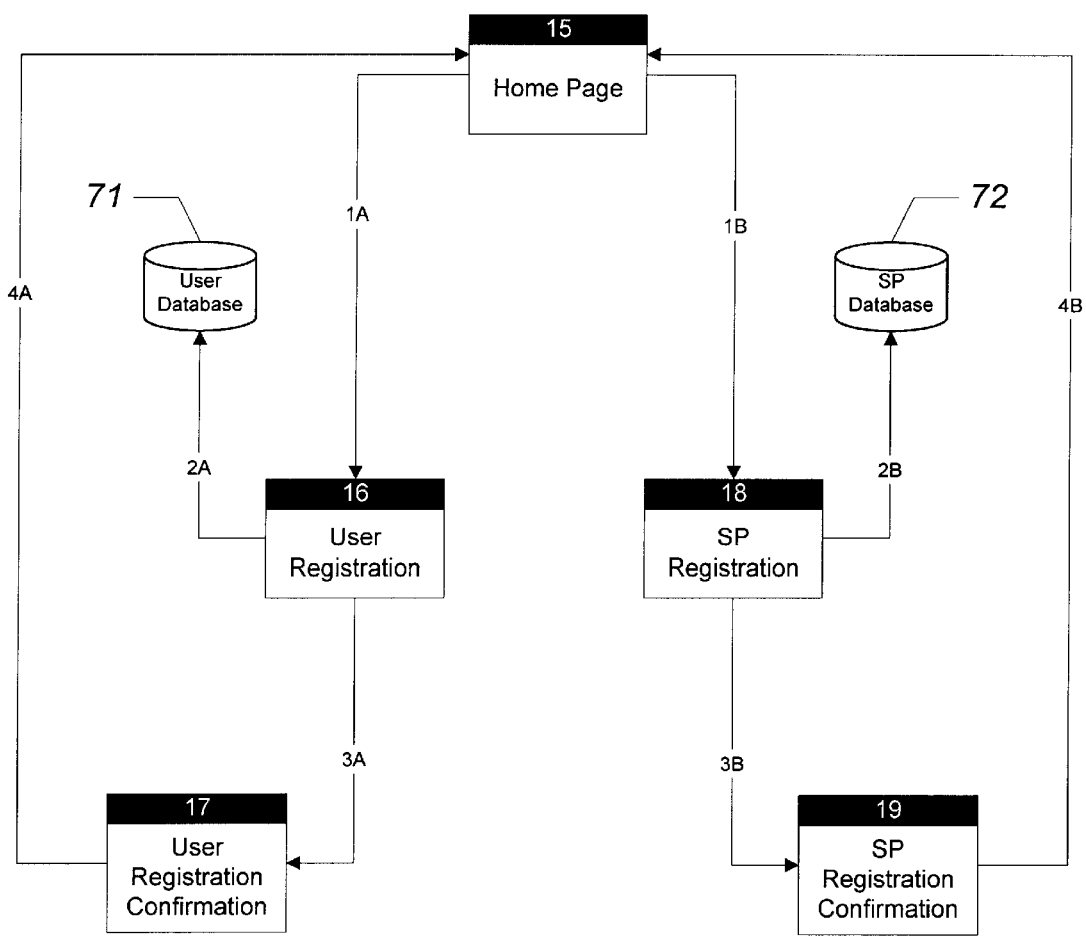
FIG. 12 is an illustration representing the User and SP Registration process.
Figure 13:
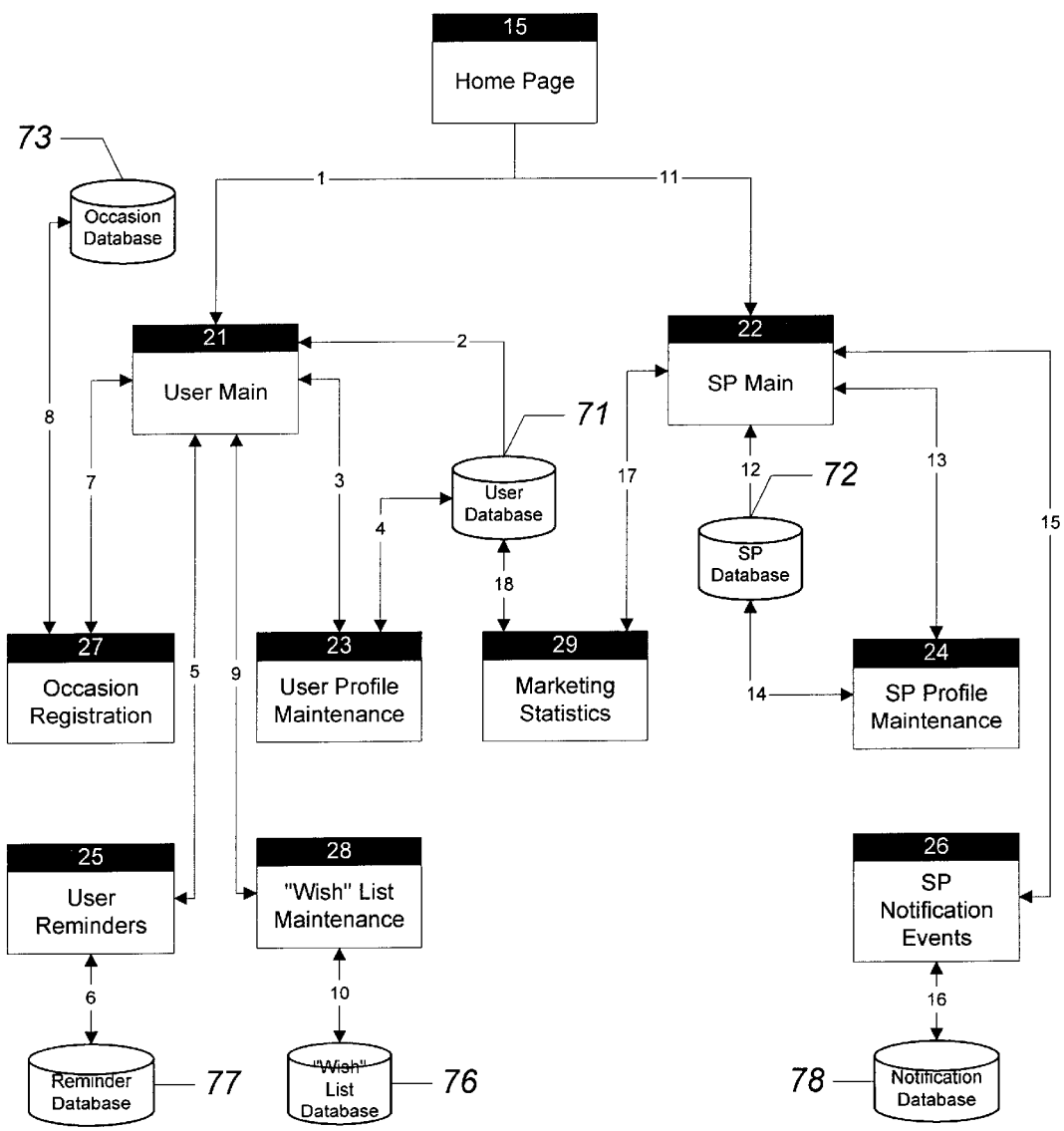
FIG. 13 is an illustration representing the processes for the Member Only functions of Users and SPs.
Figure 14:
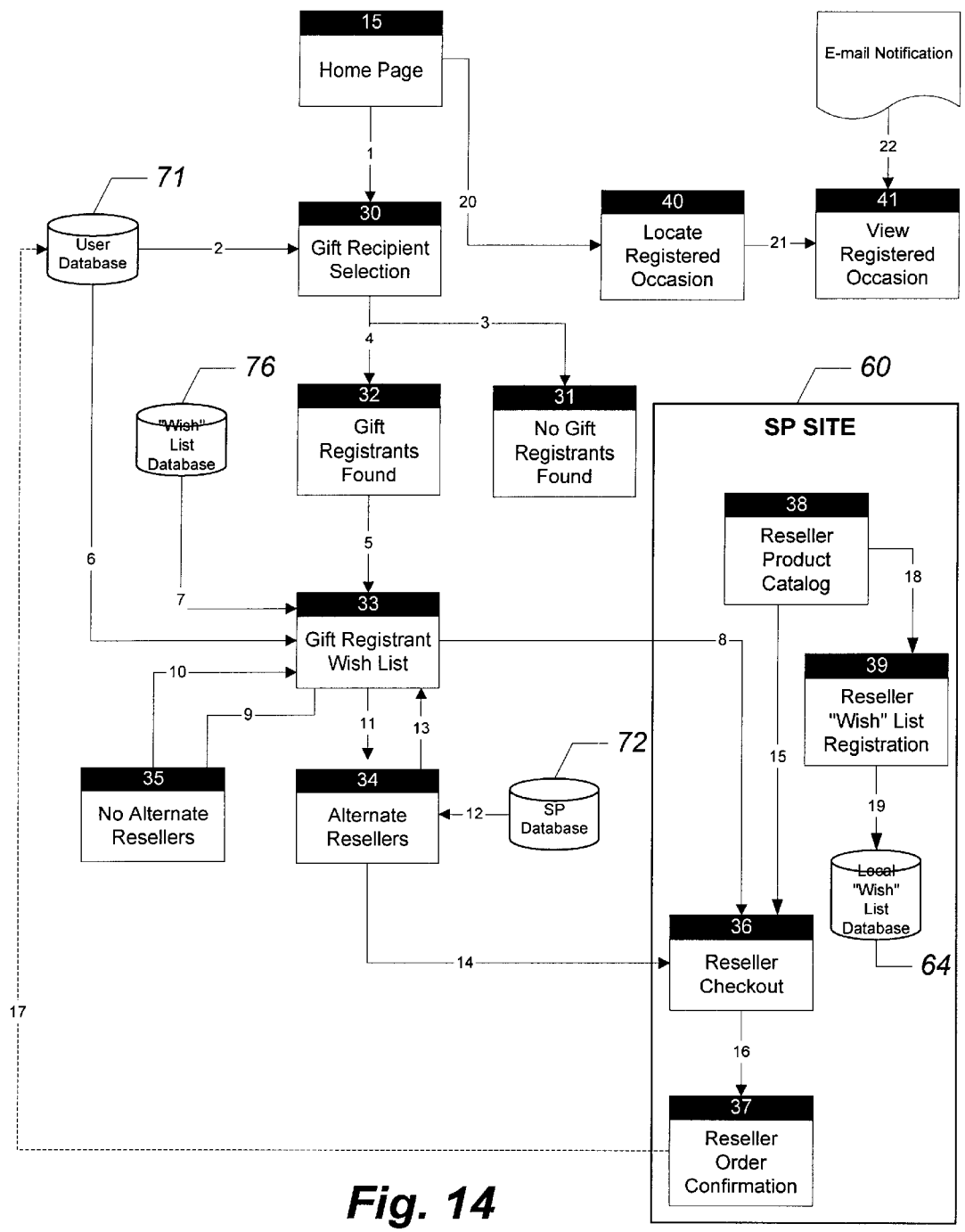
FIG. 14 is an illustration representing the Gift Purchase process.

The basic operational process flow of the Gift Registry site is shown in FIG. 12–FIG. 14. From the Home Page FIG. 13, the following functions are available: a) User Registration, b) SP Registration, c) Log onto Member Area, d) Choosing a Gift for Someone and e) View Registered Occasion. Although these are the minimally available functions, this invention is not limited to these functions and may include other links as deemed necessary.

Note that the following screen layouts are the minimum functionality for this invention and are not to be construed as the exact layout and functionality of the production system. The screen layouts are categorized below under the basic functions of the system. These screens may also have additional functionality in the production system but will provide the basics for the discussion of the operation of this invention.

With regards to FIG. 12, if the visitor to the site chooses to register with the Gift Registry site as a user, depicted by process 1A, they are then directed to the User Registration Form FIG. 16. All the required information is checked and validated before a new profile is created in the User Database 71, which is shown by process 2A. Once all the information is provided for registration is validated and stored, the new Gift Registrant is shown the User Confirmation Page FIG. 17 and then is automatically redirected back to the home page. A link is provided 300 for older browsers that don't support the automatic redirection.

Likewise, the Service provider performs a similar process except they are provided with the SP Registration Form FIG. 18, and are shown the SP Registration Confirmation page FIG. 19. SP Profile information is written to the SP Database 72 as shown in process 2b. They are also automatically redirected back to the home page from the confirmation page and are provided a link for older browsers.

Figure 21:
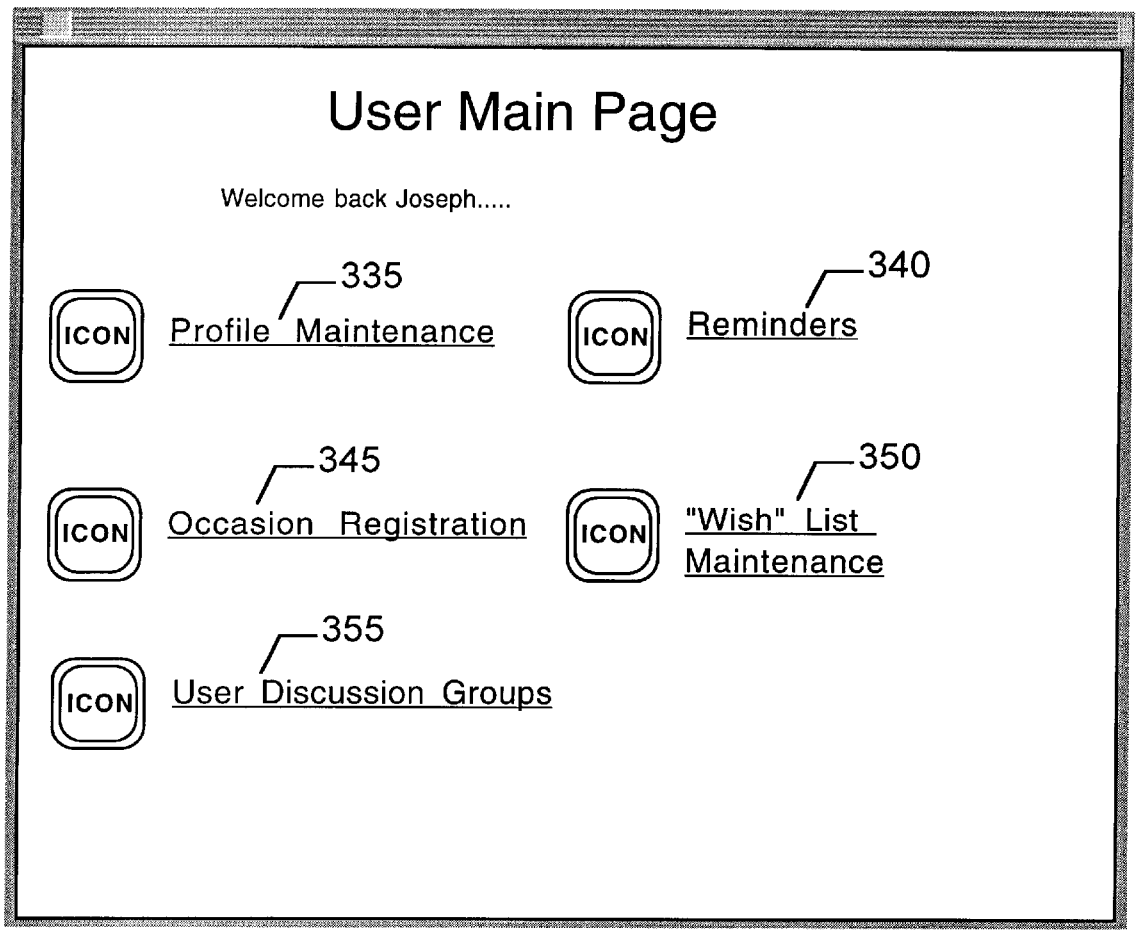
FIG. 21 is an illustration representing the User Main Page, which is a secured page from which the User performs all their associated member functions.
Figure 22:
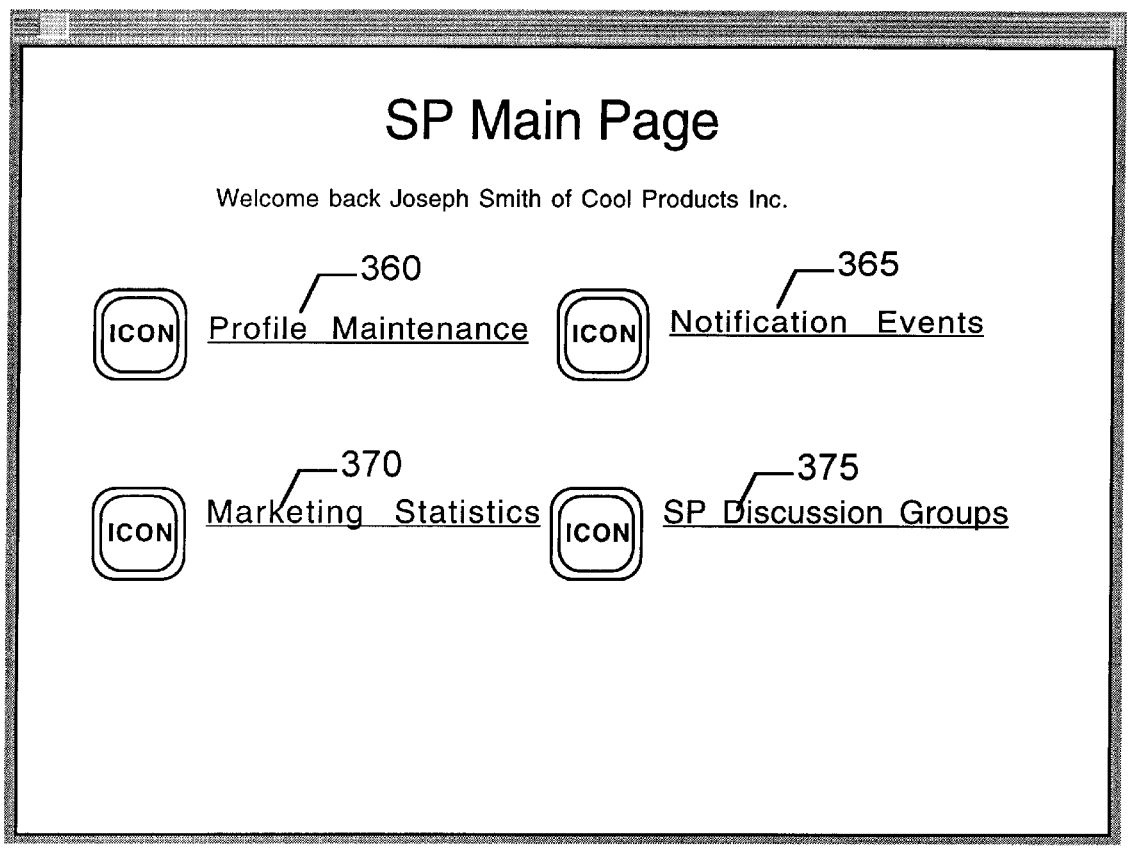
FIG. 22 is an illustration representing the SP Main Page, which is a secured page from which the Service Provider performs all their associated member functions.

In FIG. 13, the process of a registered user or Service Provider that has logged onto their secure account is shown. FIG. 21 and FIG. 22 represent the main page from which the users and Service Providers access their member functions. These member functions include FIG. 23 User Profile Maintenance, FIG. 24 SP Profile Maintenance, FIG. 25 User Reminders, FIG. 26 SP Notification Events, FIG. 27 Occasion Registration, FIG. 28 "Wish" List Maintenance and FIG. 29 Marketing Statistics.

Process Flow 1 represents the log on process for the user, which takes them to the User Main Page FIG. 21. Profile information is read from the User Database 71 and displayed to provide personalization as depicted in process flow 2. If the user chooses to update their profile represented in process flow 3, then detailed profile information is retrieved from the User Database 71 in process 4 and displayed on the User Profile Maintenance Page FIG. 23. The second member function of the user is to register reminders as shown in process flow 5 resulting in the User Reminders Page FIG. 25. Reminders are stored in the Reminders Database 77 as shown in process flow 6. The third member function of the user is to register occasions as shown in process flow 7 that displays the Occasion Registration Page FIG. 27. The results of this page are stored in the Event Database 73 as shown in process flow 8. The final member function of the user is to maintain their "Wish" List as shown in process flow 9 resulting in the "Wish" List Maintenance Page FIG. 28. These updates to the user's "Wish" List are written to the "Wish" List Database 76.

Similarly to process flow 1, process flow 11 allows the SP to log onto their secured profile and be shown the SP Main Page FIG. 22. This page is customized from profile information in the SP Database 72 as depicted in process flow 12. If the SP chooses to update their profile represented in process flow 13, then detailed profile information is retrieved from the SP Database 72 in process 14 and displayed on the SP Profile Maintenance Page FIG. 24. The second member function of the SP is to register notification events as shown in process flow 15 resulting in the SP Notification Events Page FIG. 26. The results of this page are stored in the SP Database 72 as shown in process flow 16. The final member function of the SP is to view Marketing Statistics as shown in process flow 17 resulting in the Marketing Statistics Page FIG. 29. The User Database 71 is queried for information as shown in process flow 18.

Figure 31:
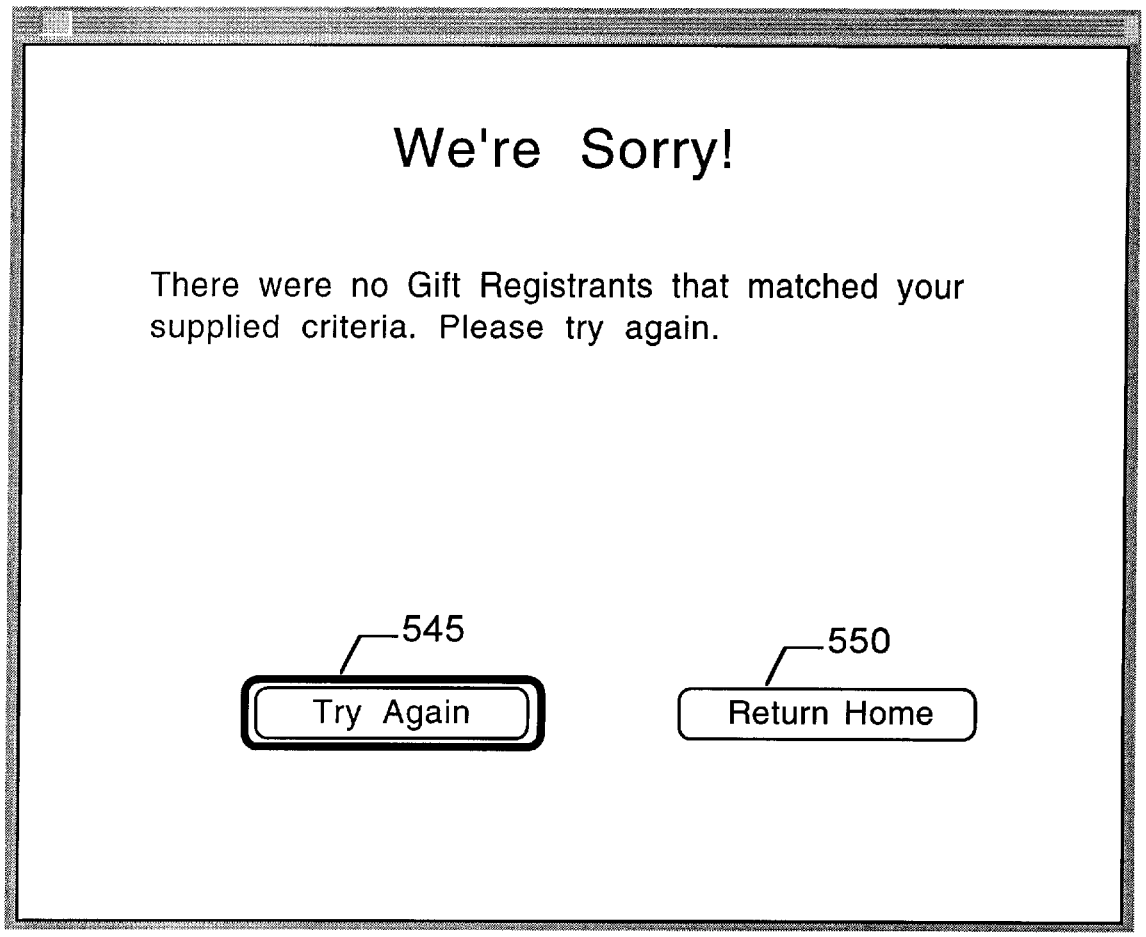
FIG. 31 is an illustration representing the No Gift Registrants Found Page.

In reference to FIG. 14, the process whereby any user, registered or not, may use the Gift Registry site to select and purchase a gift on the "Wish" list of a registered user is shown. After visiting the home page FIG. 15 and clicking on the appropriate link, the user is shown the Gift Recipient Selection Page FIG. 30. This page allows the user to find the appropriate registered user that the gift purchaser wants to purchase the gift for. Upon submitting the query, if there are no gift recipients that match the selected criteria, then the No Gift Registrants Found Page FIG. 31 is displayed. Otherwise, the results of the query are shown on the Gift Registrants Found Page FIG. 32. The Gift Registrants Found Page FIG. 32 may show one or more gift registrants that match the criteria in the above query. If only a single registrant is returned, then the site may bypass this page and go directly to the Gift Registrant Wish List Page FIG. 33. Otherwise, the desired gift registrant must be selected from the list first. On the Gift Registrant Wish List Page FIG. 33, all items on the selected gift registrant's "Wish" list will be shown in a list format for easy viewing. A future embodiment may allow for filtering the results based on criteria such as category, reseller, or price. Another future embodiment may link to an item detail page, where more detailed information on that item and preferred reseller is provided.

Figure 34:
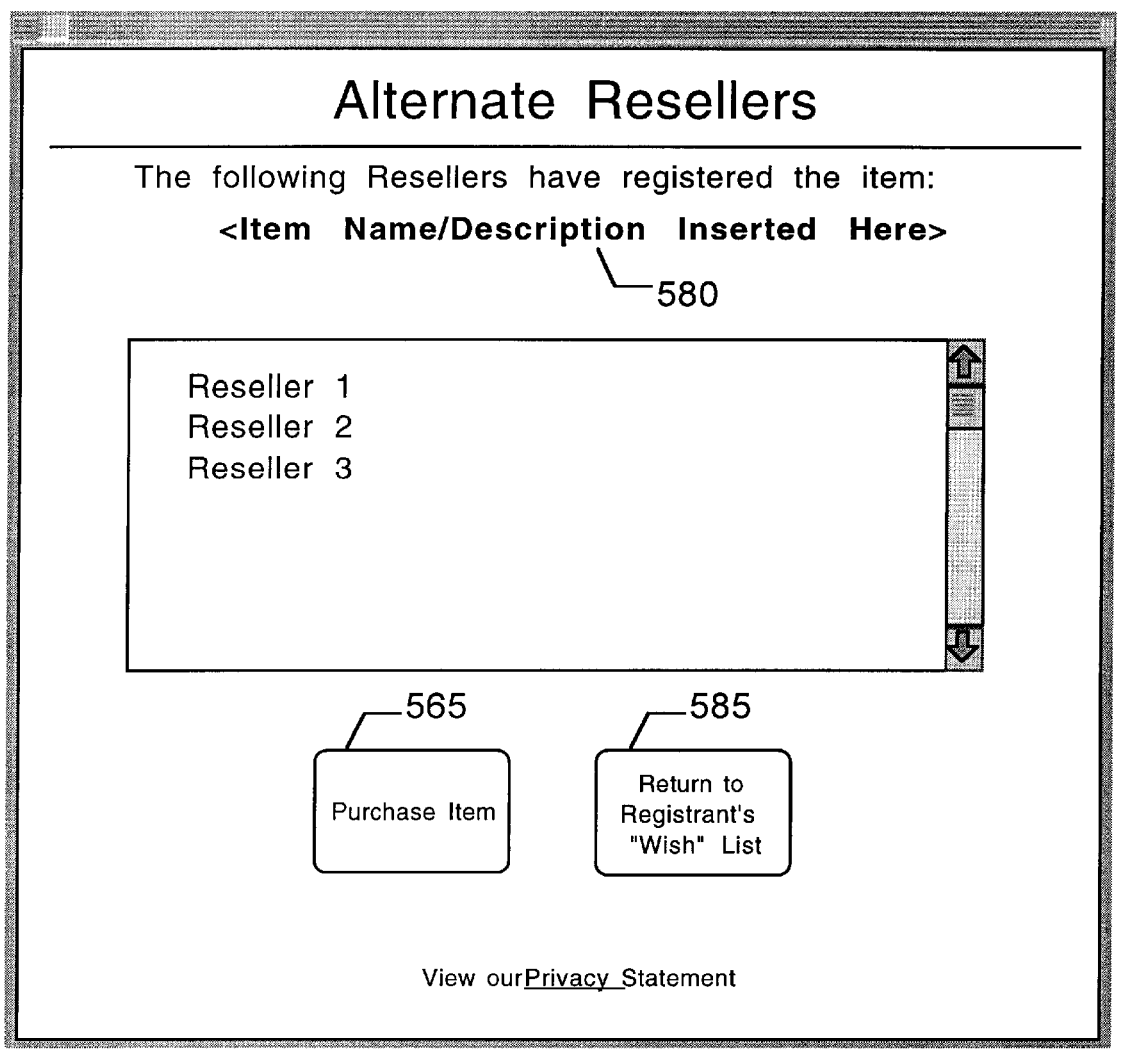
FIG. 34 is an illustration representing the Alternate Resellers Page, which shows a list of all resellers that also offer the item of interest.
Figure 35:
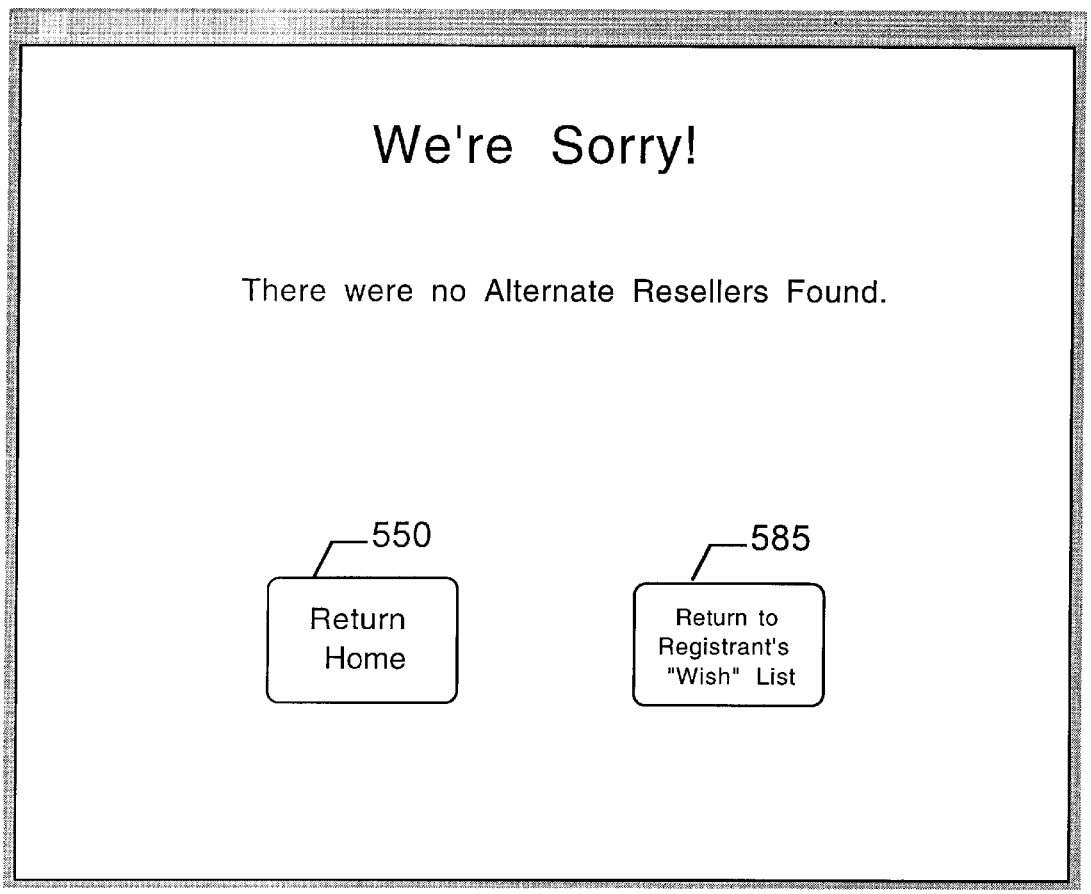
FIG. 35 is an illustration representing the No Alternate Resellers Page.

Upon selecting a desired item for purchase, the user may either choose the preferred reseller or choose to search for an alternate reseller. If the preferred reseller is chosen, then the user is shown the Reseller Checkout Page FIG. 36. Otherwise, if the alternate reseller option is chosen, then the Alternate Resellers Page FIG. 34 is displayed if there were alternate resellers found. If there were no alternate resellers found, then the No Alternate Resellers Page FIG. 35 is displayed. The system looks for alternate resellers by querying the SP Database 72 to determine if there are any registered merchants that offer the item of interest. Initially, the number of alternate resellers will be low but overtime the system will learn what items merchants have for sale as they register their products and services.

Figure 33:
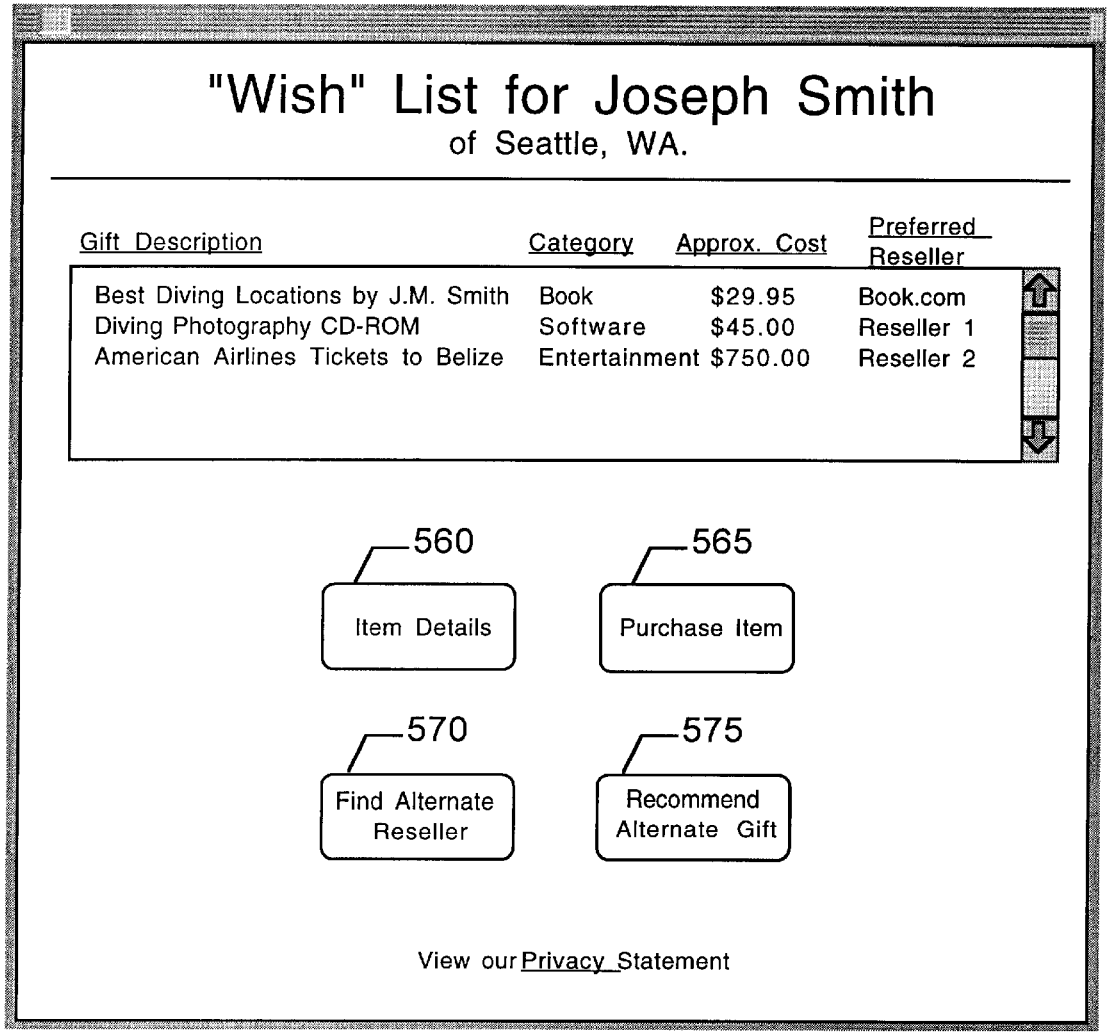
FIG. 33 is an illustration representing the Gift Registrant Wish List Page, which is a list of all items on the selected gift registrant's "Wish" list that have not been marked private.

Once a reseller is chosen from either the Gift Registrant Wish List Page FIG. 33 or the Alternate Resellers Page FIG. 34, then the system transfers the user and all appropriate information to the Reseller Checkout Page FIG. 36. This checkout page is pre-populated by the SP Server Application 62 with the item information passed by the Gift Registry Site 70 and all appropriate shipping charges and taxes. For privacy reasons, even though the gift recipient's shipping address is sent to the SP site, it is not displayed on the checkout page. Instead a message indicating that this is a gift is displayed with brief legal statement about privacy. In addition, if the gift is registered for a specific event, then that information is also sent to the SP. This allows the SP to offer other services such as gift wrapping, custom messages, and cards to be sent. Future embodiments may apply filters as to only show alternate resellers that offer the item for less than the current preferred reseller or suggest the lowest priced alternate reseller on the Gift Registrant Wish List Page FIG. 33 and eliminate the alternate reseller pages.

Figure 38:
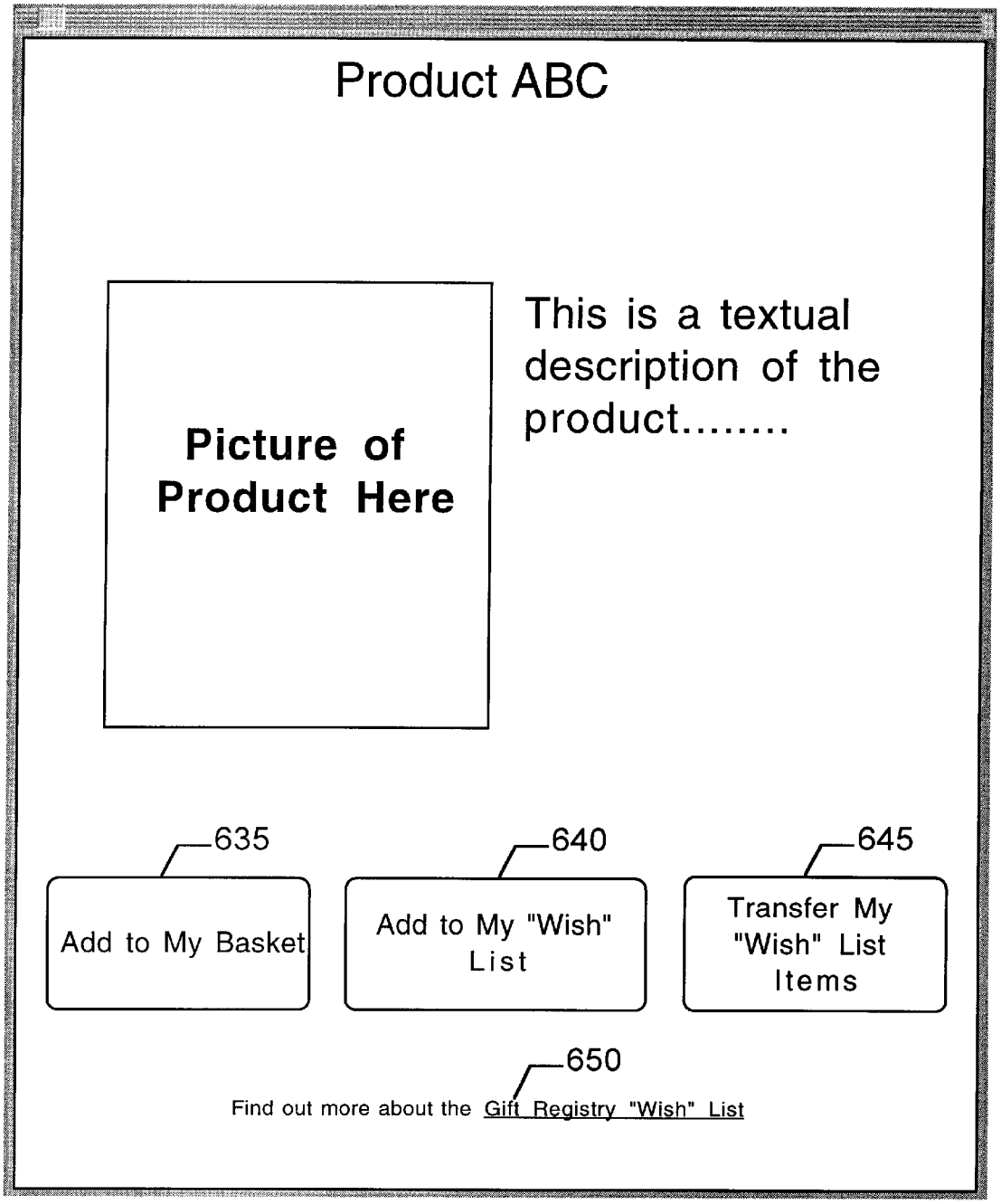
FIG. 38 is an illustration representing a sample Reseller Product Catalog Page, which shows one method of tagging an item of interest for the SP to register on your behalf as well as requesting that the items be transferred to the Gift Registry site on your behalf.

An alternate method of purchasing a gift item is to begin on the Reseller Product Catalog Page FIG. 38 and add an item to the shopping basket. Then choose to checkout as depicted in process flow 14, which will result in the Reseller Checkout Page FIG. 36.

Upon confirming the order on the SPs site, the gift purchaser will receive the Reseller Order Confirmation Page FIG. 37. At this point, all purchase information is stored in the local Gift Purchase Database 66 at the SPs site for later submittal to the Gift Register 74, which in turn updates the Centralized "Wish" List Database 76.

With regards to FIG. 14, the shopper can register "Wish" list items with the SP site 60 and have the Gift Registration Agent 68 register these with the Gift Registry Site 70 on the user's behalf. This is accomplished from any product page on the SP site 60, by first adding items to their local "Wish" list and then requesting that the Gift Registration Agent 68 transfer these items to the Gift Registrar 74 at the Gift Registry site 70. Process flow 17 depicts the transfer process that is started upon the request to transfer items and results in the Reseller "Wish" List Registration Page FIG. 39. This page obtains the necessary Gift Registry ID to associate the items with the proper gift registrant and writes this information to the Local "Wish" List Database 64 as shown in process flow 18. Note that this step may not be necessary if the merchant/reseller stores the Gift Registry ID with the user's profile.

Figure 41:
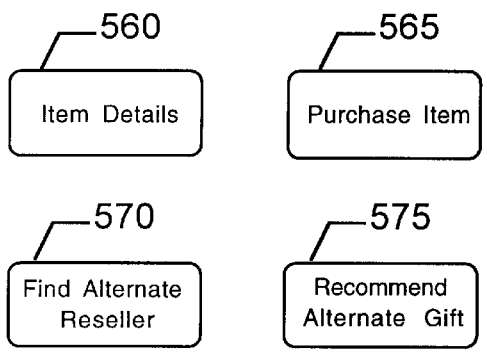
FIG. 41 is an illustration representing the View Registered Occasion Page, which allows the creation of distribution lists and tracking of gifts related to a specific event such as a wedding.

Also in regards to FIG. 14, if the visitor chooses to purchase a gift for a registered occasion, such as a wedding, they are directed to the Locate Registered Occasion Page FIG. 40 as shown in the process flow 19. Once the desired occasion is selected, the visitor is shown the View Registered Occasion Page FIG. 41 as depicted in process flow 20. An alternate path of reaching the View Registered Occasion Page FIG. 41 is from a link in an email notification sent out on the gift registrant's behalf as shown in process flow 21.

2. Home Page (FIG. 15)

Figure 15:
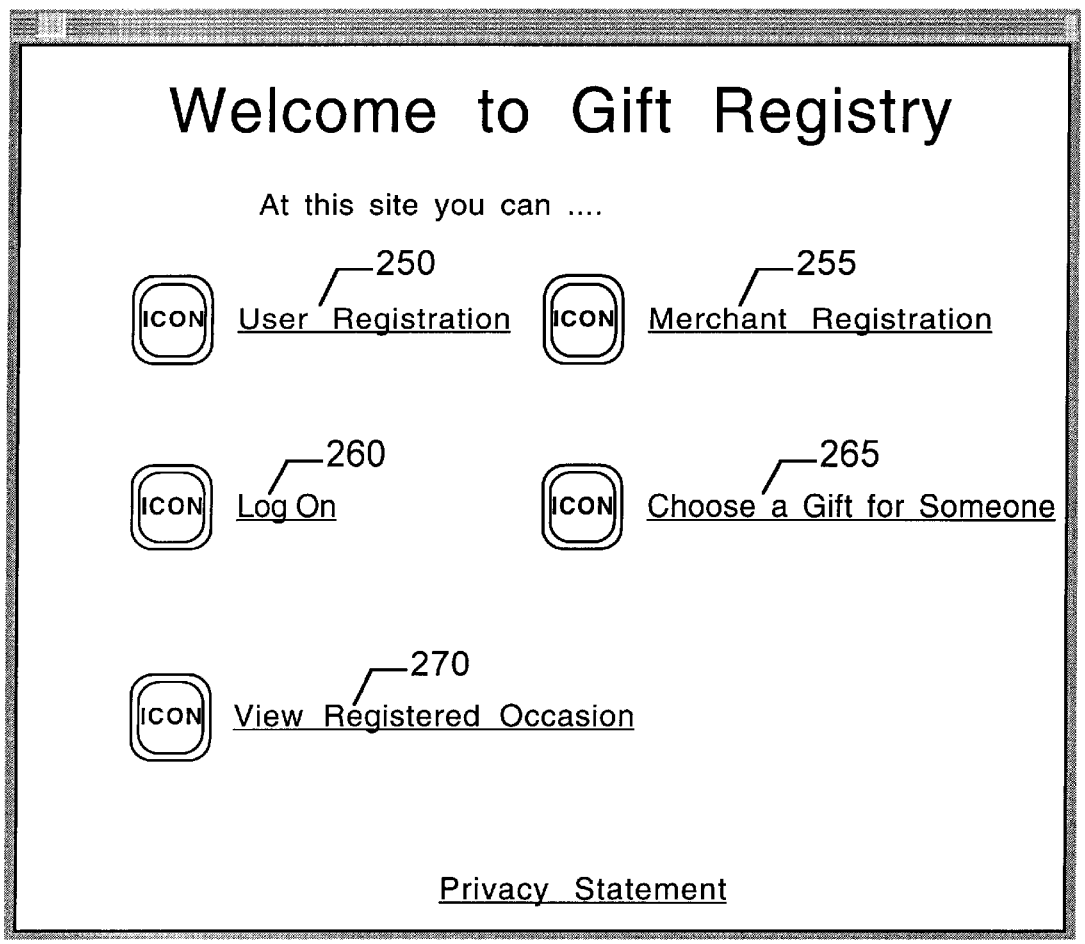
FIG. 15 is an illustration representing the Gift Registry Home Page.

Upon visiting the Gift Registry Site, the User/SP will be shown the Home Page FIG. 15 from which links will be provided for a) User Registration, b) Merchant Registration, c) Log on, d) Choose a Gift for Someone, and e) View Registered Occasion. Additional public information will be provided which does not require the user to log onto the system. This information may contain site description, press releases, and investment information. A Privacy Statement is also provided with appropriate graphical buttons for site associations such as Truste™ or the Better Business Bureau. Future embodiments will include discussion groups in special areas such as Wedding Talk or Birthday Talk. And gift certificates. Another future embodiment would be a gift recommendation expert, either a live person or a software wizard to assist in recommending gifts for individuals.

3. Registration (FIGS. 16–19)

With regards to FIG. 15, if the User Registration link 250 is selected, then the User Registration Form FIG. 16 is displayed. This form will collect information such as name, shipping address, and phone number at a minimum but other optional information may include demographic information such as age and personal tastes such as preferred shipping method and preferred carrier. In addition, the user will be provided with options to opt out of receiving marketing and promotional information. Upon clicking the User Registration Submit Button 295, the user will be shown the User Registration Confirmation Page FIG. 17. This page can be used to print their profile information as a confirmation of their registration and will provide their unique username for use with the password that they specified. This information will also be sent to the registrant at the e-mail address they specified in their profile.

Also with regards to FIG. 13, if the SP Registration link 255 is selected, then the SP Registration Page FIG. 18 is displayed. This form will also collect basic information such as contact name, company name, company address, contact phone & extension as well as all required passwords necessary for operation. Other merchant specific information that is not shown here will be collected to streamline the communication process and to authenticate the merchant with the Gift Registry Service. Upon clicking the SP Registration Submit Button 315, the SP will be shown the SP Registration Confirmation Page FIG. 19.

4. Logon Authentication (FIG. 20)

Figure 20A:
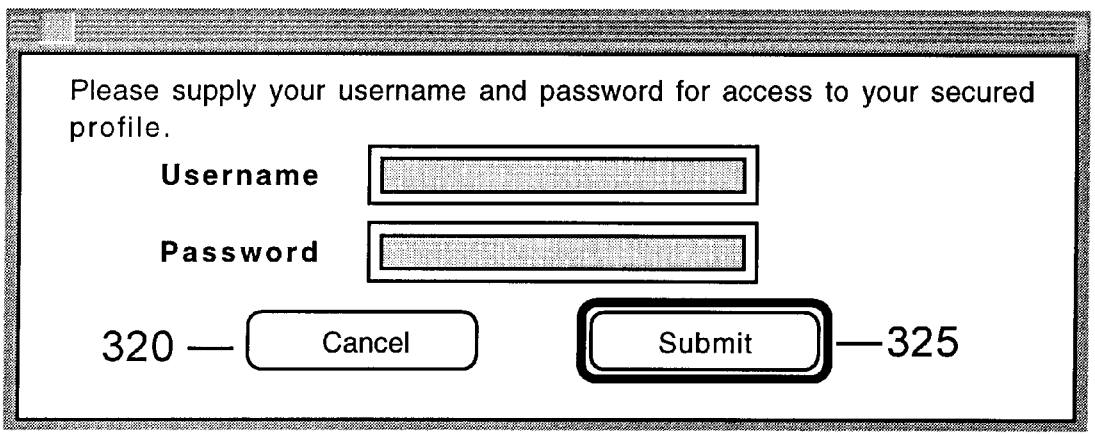
FIGS. 20A–C are illustrations representing dialog screens used by the system for user authorization.
Figure 20B:
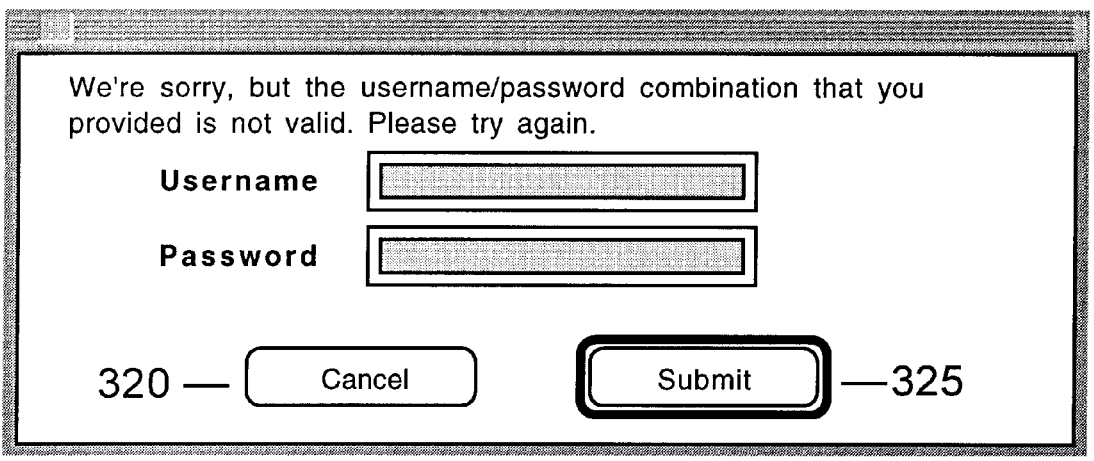
Figure 20C:
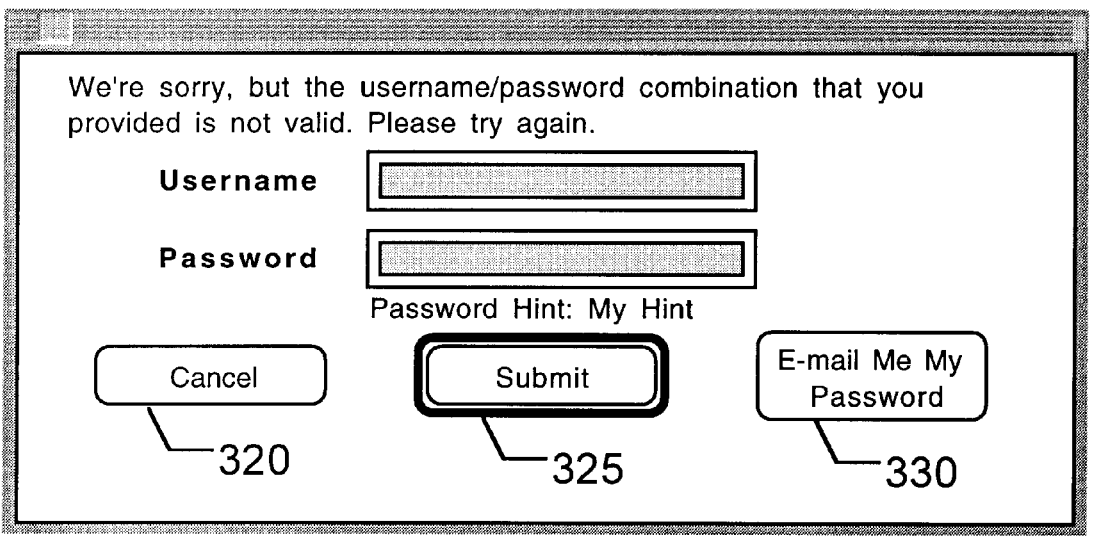

With regards to FIG. 13, if the Log On link 260 is selected, then the User/SP must first authenticate using the user interface dialog depicted in FIG. 20A. If the User/SP does not provide a valid username/password combination, then they will be shown either FIG. 20B or FIG. 20C, where the User/SP has the opportunity to try again. If the username is not valid, the User/SP will be shown FIG. 20B. Otherwise, if the username is valid, but the password is not, then the User/SP will be shown FIG. 20C, which adds the associated password hint for the given username. Also available on this screen is a button to have the Gift Registry system automatically email them their password. This comes in handy if they forget their password, but note that the system only sends the password to the email address of the profile associated with the given username. This is a standard practice in the industry.

If the User successfully logs on, they will be greeted with the User Main Page FIG. 21. On the User Main Page, there are buttons for performing the functions of a) Editing their Profile, b) Registering Reminders, c) Registering Occasions, d) Maintaining "Wish" lists, and e) User Discussion Groups.

Likewise, a Service Provider will be greeted with SP Main Page FIG. 22. From the SP Main Page, there are buttons for performing the functions of a) Editing their Profile, b) Registering Notification Events, c) Viewing Marketing Reports, and d) SP Discussion Groups.

5. Main Page (FIGS. 21–22)

The User Main Page FIG. 21 is the central location from where they access the member functions associated with users and their secured profile. Clicking the User Profile Maintenance Link 335 will display the User Profile Maintenance Page FIG. 23 allowing the user to update their profile. The User Reminders Link 340 will display the User Reminders Page FIG. 25, which allows the user to add, modify, and delete reminders. The User Occasion Registration Link 345 will display the Occasion Registration Page FIG. 27, which allows the user to add, modify, and delete distribution lists that are associated with events. The User "Wish" List Maintenance Link 350 will display the "Wish" List Maintenance Page FIG. 28, which allows the user add, modify, and delete items that they would like to receive. Lastly, the User Discussion Groups Link 355 will allow the user to participate in discussion groups on the various types of events. This is commonly called "Chat" groups in the industry and is not shown here since it will involve an off-the-shelf 3$^{rd}$ party software application.

Similarly to the User Main Page FIG. 21, the SP Main Page FIG. 22 is the central location from where the merchant contact can assess the member functions associated with merchants and their secured profile. Clicking the SP Profile Maintenance Link 360 will display the SP Profile Maintenance Page FIG. 24 allowing the merchant to update their profile. The SP Notification Events Link 365 will display the SP Notification Events Page FIG. 26, which allows the SP to add, modify, and delete notification events. The SP Marketing Statistics Link 370 will display the Marketing Statistics Page FIG. 29, which allows the merchant to analyze user gift registrations and purchase information. Similar to the User Discussion Group Link 355, the SP Discussion Group Link 375 allows the SP to participate in industry-specific discussion groups with other SPs.

6. Profile Maintenance (FIGS. 23–24)

The User Profile Maintenance Page FIG. 23 and SP Profile Maintenance Page FIG. 24 are functionally identical to their corresponding counterparts of User Registration Page FIG. 16 and SP Registration Page FIG. 18.

7. Reminders and Notification Events (FIGS. 25–26)

With regards to User Reminders Page FIG. 25, the user may register multiple reminders by selecting the event and date of event along with an optional description.

The merchant has a more sophisticated notification mechanism as defined in the SP Notification Events Page FIG. 26. On this page, the merchant identifies the method of notification by using the Notification Method Type Dropdown Menu 430 from which they can select from notification methods such as email message and pagers. They will be notified of the event when the condition identified in the Event Type Drop-down menu 435 meets the criteria identified in the Condition Type Drop-down Menu 440 along with its corresponding Condition Value Edit Box 445 for all the items that are associated with the product category identified in the Item Category Drop-down Menu 450.

Some event types that may appear in the Event Type Drop-down menu 435 are "User Threshold", and "New Registrants for Month". Others will be defined at a later time.

Some conditions that may appear in the Condition Type Drop-down Menu 440 are "greater than", "greater than or equal", "equal", "less than", and "less than or equal".

Optionally, filters can be applied so that only registrants that have registered gifts that match the name identified in the Item Name Filter Edit Box 455 and/or that match the Item UPC Filter Edit Box 460 and/or that match the SP as the Preferred Reseller if the Preferred Reseller Filter Checkbox 465 is checked, will be shown.

Once the merchant is satisfied with their entry, they can click the SP Notification Submit Button 470 to have the entry saved in the Notification database 78.

8. Occasion Registration Page (FIG. 25)

The Occasion Registration Page FIG. 25 allows the user to register for a major occasion such as a wedding or baby shower. This page is the starting point for all services related to that event including possible links to discussion groups, other resources, and requests for consultation. These are left to a future embodiment of this invention.

The user begins by defining the type of event in the Event Type Drop-down Menu 400 and setting the appropriate date of the event using the Month Drop-down Menu 405, Day Drop-down Menu 410, and Year Drop-down Menu 415. An optional description may be entered in the Event Description Edit Box 420.

In the Event Distribution List Section 475, Event Distribution lists can be created, modified and deleted. In addition, a reminder can be sent to the entire distribution list. The Gift Registry site will have preformatted email notifications based on the event type. The process to do this is obvious to someone knowledgeable in the field.

Likewise, the Gift Registration List Box 500 allows the user to add, modify, and delete gifts that they would like to receive in conjunction with the event. Again the specifics on how to do this is obvious to someone knowledgeable in the field. Although these gift registrations are for a one-time event, any gift requests not received by the events date may later be transferred to the user's general "Wish" list.

An alternate embodiment of this page may provide multiple registration pages that are specific to the different types of events such as weddings, baby showers, etc.

9. "Wish" List Maintenance (FIG. 28)

The "Wish" List Maintenance Page FIG. 28 allows the user to add, modify, and delete gift items. By clicking on an individual item, the history of that item will be shown. This may include when it was registered, how it was registered (directly or by SP site), the Preferred and Alternate Reseller (which may be suggested based on "sale" event of registered SP), and a history of who purchased which item and where. Note that the details of this process is not shown here in this invention due to the fact that it is obvious to someone knowledgeable in the field. An alternate embodiment may allow sorting.

10. Service Provider Marketing Statistics (FIG. 29)

The Marketing Statistics Page FIG. 29 allows the SP to view various types of marketing reports including a) Product Information, b) User Demographics, c) Merchant Demographics, d) Notification Information, e) Gift Purchases, and f) Registered Occasions Information. If Dynamic HTML is supported by the user's browser then the section headings will be collapsed and contain the Expand Outline Arrow 520 to the left of the heading. Upon clicking the Expand Outline Arrow 520, the outline expands and show individual reports related to that topic. Likewise, clicking the Collapse Outline Arrow 525 collapses the outline and removes the individual reports under that topic. If Dynamic HTML is not supported by the user's browser, then the page will be displayed with the entire outline expanded for all topics.

11. Choosing a Gift for Purchase (FIGS. 30–38)

With regards to FIG. 13, if the Choose a Gift for Someone link 265 is selected, then the User is shown the Gift Recipient Selection Page FIG. 30. From this page, the visitor is presented with two options for selecting the appropriate gift registrant that they would like to make a purchase for. If the visitor already knows the Gift Registrant's ID they may enter it in the Gift Registrant ID Edit Box 530 and select the appropriate radio button of the Gift Recipient Search Method Radio Group 535. Otherwise, they select the other radio button and enter name and address information. Either way, upon clicking the Gift Recipient Search Button 540, the system will look for matches in the User Database 71.

If no matches were found, then the No Gift Registrants Found Page FIG. 31 is displayed. From this page, they may either return to the Gift Recipient Selection Page FIG. 30 by clicking the Try Gift Recipient Search Again Button 545 or return to the User Home Page FIG. 15 by clicking the Return to Home Button 550.

Figure 32:
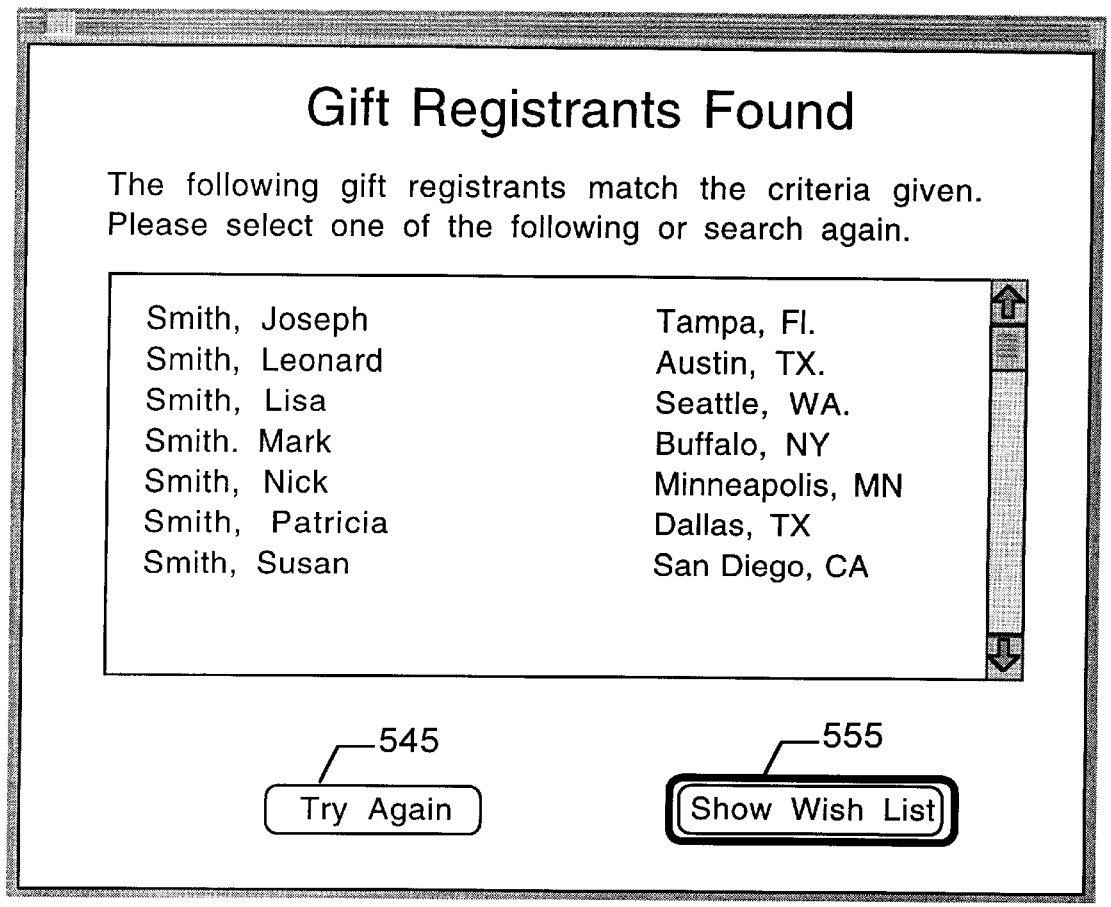
FIG. 32 is an illustration representing the Gift Registrants Found Page, which are the results from the search for a gift registrant.

If matches were found, then the Gift Registrants Found Page FIG. 32 is displayed. This page show all the matches that were found based on the criteria given earlier. If the results are unsatisfactory, the visitor may click on the Try Gift Recipient Search Again Button 545 to return to the Gift Recipient Selection Page FIG. 30. Otherwise, they select the appropriate gift registrant from the list and then click on the Show Wish List Button 555 to be shown the Gift Registrant Wish List Page FIG. 33.

On the Gift Registrant Wish List Page FIG. 33, all registered "Wish" list items are displayed in a brief format. More detailed information on an item can be obtained, by selecting the item and then clicking the Items Detail Button 560. If the visitor wants to purchase an item with the preferred reseller, then they first select the item and then click the Purchase Item Button 565 to be shown the Reseller Checkout Page FIG. 36.

If the visitor prefers to find an alternate reseller for an item, they must first select the item and then click the Find Alternate Reseller Button 570, which results in either the Alternate Resellers Page FIG. 34 or the No Alternate Resellers Page FIG. 35 depending upon whether matches were found.

If the visitor is not satisfied with the gifts that were registered by the gift registrant, they may choose the Recommend Alternate Gift Button 575. The preferred embodiment of this feature would recommend alternate gifts based on likes and desires of the gift registrant and preferred resellers. An alternative embodiment may be canned recommendations based on the event type. Another alternative embodiment may be a "live" expert that provides consultation.

With regards to the Alternate Resellers Page FIG. 34, the name and description of the previously selected item is displayed at the top of the page 580. From this page, the visitor may either select an alternate reseller, click the Purchase Item Button 565 and be re-directed to the Reseller Checkout Page FIG. 36 or click the Return to Registrant's "Wish" List Button 585 and be shown the Gift Registrant Wish List Page FIG. 33.

If no alternate resellers were found, then the No Alternate Resellers Page FIG. 35 will be displayed. The options available to the visitor on this page are to either to return to the User Main Page FIG. 15 by clicking the Return to Home Button 550 or returning to the Gift Registrant Wish List Page FIG. 33 by clicking the Return to Registrant's "Wish" List Button 585.

Upon reaching the Reseller Checkout Page FIG. 36, the gift purchaser is shown a pre-populated checkout page with the item or items selected earlier. Only minor modifications are allowed to the basket at this point. This includes changing the quantity of an item by entering a different value in the Item Quantity Edit Box 590 and clicking the Recalculate Basket Button 600 to update the financial calculations. The other modification is the shipping method as selected from the Shipping Method Drop-down Menu 595.

The appropriate payment information must be entered before an order is accepted. Otherwise error messages are displayed notifying the user what information is required. Payment Information is entered using the Credit Card Type Drop-down Menu 605, Credit Card Expiration Month Drop-down Menu 610, and Credit Card Expiration Year Drop-down Menu 615. In addition, the gift purchaser must enter the name on the credit card in the Credit Card Name Edit Box 620 and the actual credit card number in the Credit Card Number Edit Box 625.

Upon clicking the Submit Order Button 630, the server application 62 performs a credit card prefix check and then a mod 10-validation check before committing the order. Both of these procedures are well known in the industry. If these initial checks pass, then a credit card authorization check is made and optionally a fraud check depending upon the type and value of the purchase. If the credit card authorization fails, the gift purchaser is shown a Credit Card Error page. Otherwise, the Reseller Order Confirmation Page FIG. 37 is displayed for a confirmation of the order. A duplicate of this information would also be sent via e-mail to the gift registrant without the payment totals in a preferred embodiment. An alternative embodiment would be for the Gift Registry site 70 to send a notice to the gift registrant upon the receiving of a gift purchase notice.

12. Reseller Function (FIGS. 38–39)

With regards to FIG. 38, the shopper has four options available on every product page of the SP site 60. The first option is to add the item to their basket by clicking on the Add to My Basket Button 635. The second option is to add the item to their local "Wish" list for purchase at a later time or to receive as a gift. This is accomplished by clicking the Add to My "Wish" List Button 640 and having the Server Application 62 write the information to the Local "Wish" List Database 64.

The third option is to request the Gift Registration Agent 66 to transfer the shopper's local wish list to the Gift Registry site 70. This is accomplished by clicking the Transfer My "Wish" List Items Button 645 and having Gift Registration Agent 66 communicate with Gift Registrar 74 on the user's behalf. If the gift registrant's ID is not already known then the Wish List Registration Page FIG. 39 is displayed, where the gift purchaser can provide the appropriate Gift Registry ID in the Gift Registry ID Edit Box 655 if known and click the Reseller Register "Wish" List Button 660. Otherwise, they can provide their email address in the E-Mail Address Edit Box 665 and click the Look up Gift Registry ID Button 670. The shopper will then either receive a confirmation that the transfer occurred successfully or that the Gift Registry ID could not be found.

The final option is to find out more information about the Gift Registry Service by clicking the Gift Registry Promotion Link 650 and being re-directed back to an appropriate page on the Gift Registry site 70.

13. Viewing a Registered Occasion (FIGS. 40–41)

With regards to FIG. 13, if the user chooses the View Registered Occasion Link 270, then the Locate Registered Occasion Page FIG. 40 is displayed. This page allows the visitor to search for the appropriate occasion. They start by selecting the event type by using the Event Type Drop-down Menu 400 and then entering the appropriate item in the Associated Last Name Edit Box 675. Optionally, the user may also enter a city in the City Edit Box 680, select a state in the State Drop-down Menu 280, and select a country in the Country Drop-down Menu 285. Once the appropriate information is entered, the visitor clicks the Find Occasion Button 685 to start the search.

If no registered occasions are found, then an error message is displayed. Otherwise, the Registered Occasion Page FIG. 41 is displayed. The operation of the items on this page is identical to the same items on the Gift Registrant Wish List Page FIG. 33.

CONCLUSION, RAMIFICATIONS AND SCOPE

Thus the reader will see that the Gift Registry site defined in this invention provides a highly efficient and economical method of registering items of interest in a timely manner by individuals of all ages. Furthermore, this invention has the additional advantages in that It permits alternate methods of payment to be accepted by different Service Providers.

It allows Electronic Gift Certificates to be used that are tracked by the Gift Registry site and honored as a form of payment at participating merchants.

It allows for in-store Gift Registry Kiosks to link directly to the Gift Registry site.

It allows reminders to occur on a repeating basis such as weekly, monthly, or yearly or other schedules defined by the user.

It permits email notifications in advance of yearly events such as Mother's Day or Father's Day reminding individuals of the event and suggesting gifts. These email notifications may display previous purchases and provide links to member SP sites. An example may be an online flower merchant for Mother's Day.

It permits the handling of the entire event including local halls for rent, consultants and related items. For example, for a wedding, a choice of designs may be provided for wedding invitations which may be personalized with the receiver's name. In addition, registered halls may be searched based on criteria such as location, dates available, and accommodation size.

It permits a frequent shopper program whereby gift registrants may obtain credit towards future purchases for all purchases they make or a gift purchaser makes on their behalf.

Although the description above contains much specificity, this should not be construed as limiting the scope of the invention, but as merely providing illustrations of some of the presently preferred embodiments of this inventions. Many variations are possible. For example, the graphical look and feel and screen layout will periodically change to provide fresh content.

Thus the scope of the invention should be determined by the appended claims and their legal equivalents, rather than by the examples given.

What is claimed is:

1. A system for providing an online multi-merchant gift registry service over a distributed network, with the capability to support multiple online merchants of any size and from any net-accessible location in the world, the system comprising:

a plurality of service provider (SP) sites connected to the distributed network, each SP site running at least one service application to provide an online service to users over the distributed network;

a plurality of user computers connected to the distributed network, each user computer running at least one client application for accessing online services of the SP sites;

a gift registry site connected to the plurality of SP sites, the gift registry site running at least one gift registry service, the gift registry site including a user database containing authentication information of users that have registered to use the gift registry service, and an SP database containing authentication information of service providers that have registered to participate in the gift registry service, the registered users accessing the SP sites from the user computers over the distributed network;

a database which stores user-specific customization data, the customization data specifying preferences of the registered users with respect to online services of the SP sites, the customization data provided to the SP sites by the online multi-merchant gift registry service to enable the SP sites to customize the online services to the preferences of individual registered users;

a database which stores service provider information, the service provider information specifying communication information necessary for establishing secure connections between the service providers and the gift registry site;

a database which stores registered events, the registered event database maintaining for each event a list of gift items and distribution lists associated with said event;

a database which stores wish list items;

a database which stores user reminders;

a database which stores SP notifications, the SP notifications being triggered by registered events, the SP notifications causing the SP sites to perform site-specific actions; and an authentication protocol for enabling the gift registry service to authenticate users and service providers, and communication links with service providers' systems, the authentication protocol implemented by software components of the service providers' sites and the gift registry site.

2. The system of claim 1, wherein each SP enables site a wish list item or a gift purchase to be registered on behalf of a user.

3. The system of claim 1, wherein a gift purchaser purchases a gift for a registrant.

4. The system of claim 3, comprising a search mechanism for accessing a gift registrant's wish list.

5. The system of claim 3, wherein the gift registry site refers a gift purchaser to an SP site with gift information that will pre-populate a virtual shopping basket of the gift purchaser, and present a checkout page to the gift purchaser to enable a speedy purchase;

and wherein said SP site may be either a preferred reseller specified by the gift registrant or an alternate reseller chosen by the gift purchaser.

6. The system of claim 3, comprising means wherein gift recommendations are provided based on individuals' past buying habits and desires.

7. The system of claim 1, comprising means for sending automatic reminder messages to users, the sending of said automatic reminder messages being triggered by the occurrence of pre-registered events.

8. The system of claim 1, wherein a service provider registers a sale event, and wherein said sale event triggers automatic notifications to registrants who have registered an interest in at least one item upon which said service provider registers a sale event.

9. The system of claim 1, comprising means for enabling users to register major events of multiple types, and be provided event services, the event services comprising the registration of event-specific gift desires, distribution lists, discussion groups, or other related resources.

10. The system of claim 9, wherein users are enabled to select from multiple styles of stationery for mailings.

11. The system of claim 9, wherein users reserve halls and meeting rooms for the registered events.

12. The system of claim 9, wherein users contract with other event-related business.

13. The system of claim 12, wherein said event-related businesses comprise caterers, photographers, videographers, consultants, florists, clowns, comedians, musicians, dj's, or other entertainers.

14. The system of claim 9, wherein users send out pre-canned templates with customized information as email notices to all users identified in distribution lists.

15. The system of claim 1, wherein service providers obtain marketing information.

16. A gift registry service apparatus for enabling gift registrants to register wish lists of items desired as gifts for weddings or other occasions, the gift registry service facilitating seamless connection among gift registrants, purchasers, and registered merchants for the registering of user wish list items and the purchasing of items, the apparatus comprising:

- a gift registry server operatively connected to a computer network, the server having a processor and a computer readable memory, the memory storing gift registry implementation software, including database management software, customer access software, and artificial intelligence software;
- at least one data structure including a list of gift registrants along with corresponding ID and profile information, and including a list of participating merchants, with their corresponding communication information, the list of participating merchants being a subset of the sites available to users of the computer network, the at least one data structure further including data regarding the registration of occasions, wish lists, reminders, and notifications;
- a first data entry system through which first information about gift registrants is entered into the computer system, the first information for each registrant including at least a first name, last name, and e-mail address;
- wherein a unique identifier is assigned to each registrant, the unique identifier comprising the registrant's first name, last name, and e-mail address;
- a second data entry system capable of receiving second information, the second information including a list of potential gifts or wish list items which the registrant has identified as desired, and a unique identifier associated with a preferred reseller of those gifts;
- a database storage system that stores and retrieves the first and second information about the registrant and the unique identifier associated with the preferred reseller of the desired potential gifts;
- a third data entry system through which information about service providers/merchants is entered into the computer system, the third information for each service provider including at least a contact name and e-mail address; and
- a fourth data entry system capable of receiving fourth information, the fourth information including marketing reports which can be used to tailor individualized services or products to present or potential customers;
- and wherein the database storage system includes data regarding occasions, in addition to wish list items.

17. The gift registry apparatus of claim 16, wherein the first, second, third, and fourth data entry systems comprise a client application running on a user computer.

18. The gift registry apparatus of claim 16, further comprising updating means for updating data in the database storage system as a prospective purchaser buys a gift from a participating service provider, the gift being on the list of potential gifts for a particular registrant, and the participating service provider registers the gift purchase on the registrant's behalf.

19. The gift registry apparatus of claim 16, further comprising a database storage system which resides on more than one computer at one or more sites, the computers working in tandem.

\* \* \* \* \*